United States Patent
Lee et al.

(10) Patent No.: US 12,495,324 B2
(45) Date of Patent: Dec. 9, 2025

(54) APPARATUS AND METHOD FOR REPORTING CSI IN WIRELESS COMMUNICATION SYSTEM

(71) Applicant: Samsung Electronics Co., Ltd., Suwon-si (KR)

(72) Inventors: Seunghyun Lee, Suwon-si (KR); Hyeondeok Jang, Suwon-si (KR); Suhwook Kim, Suwon-si (KR); Wonjun Kim, Suwon-si (KR); Juho Lee, Suwon-si (KR); Changsung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 18/227,229

(22) Filed: Jul. 27, 2023

(65) Prior Publication Data
US 2024/0040420 A1    Feb. 1, 2024

(30) Foreign Application Priority Data

Aug. 1, 2022   (KR) .................. 10-2022-0095674

(51) Int. Cl.
*H04W 24/10* (2009.01)
*H04W 24/02* (2009.01)

(52) U.S. Cl.
CPC .......... *H04W 24/10* (2013.01); *H04W 24/02* (2013.01)

(58) Field of Classification Search
CPC ........ G06N 3/04; H04B 7/0626; H04L 5/005; H04W 8/24; H04W 24/02; H04W 24/10; H04W 72/23
See application file for complete search history.

(56) References Cited

U.S. PATENT DOCUMENTS

| 2018/0102817 A1 | 4/2018 | Park et al. |
| 2018/0115357 A1 | 4/2018 | Park et al. |

(Continued)

FOREIGN PATENT DOCUMENTS

| KR | 10-2020-0062093 A | 6/2020 |
| WO | 2021258259 A1 | 12/2021 |

(Continued)

OTHER PUBLICATIONS

International Search Report and Written Opinion of the International Searching Authority dated Oct. 23, 2023, in connection with International Application No. PCT/KR2023/010360, 7 pages.

(Continued)

*Primary Examiner* — Thomas R Cairns

(57) ABSTRACT

The present disclosure relates to a 5G or a 6G communication system for supporting higher data rates beyond a 4G communication system such as LTE. The present disclosure provides a method for an AI-based CSI report in a 5G or 6G communication system. The method performed by a base station in a wireless communication system include receiving capability information indicating whether the UE supports generation of AI-based CSI, receiving information on a change in inference time related to the AI-based CSI generation and information on a change in a channel state, based on the capability information, identifying information on a CSI report timing, based on the information on the change in the inference time and the change in the channel state, transmitting RRC configuration information including the CSI report timing, transmitting a CSI-RS, and receiving the CSI report based on the CSI-RS and the information on the CSI report timing.

20 Claims, 8 Drawing Sheets

(56) References Cited

U.S. PATENT DOCUMENTS

| | | |
|---|---|---|
| 2019/0215044 A1 | 7/2019 | Noh et al. |
| 2021/0409086 A1 | 12/2021 | Yerramalli et al. |
| 2025/0016593 A1* | 1/2025 | Narayanan .......... H04L 25/0254 |
| 2025/0168663 A1* | 5/2025 | Fujishiro ............... H04W 24/02 |
| 2025/0168706 A1* | 5/2025 | Fujishiro ............... H04W 24/02 |

FOREIGN PATENT DOCUMENTS

| | | |
|---|---|---|
| WO | 2022040055 A1 | 2/2022 |
| WO | 2022040661 A1 | 2/2022 |
| WO | 2022050440 A1 | 3/2022 |
| WO | 2022104334 A1 | 5/2022 |
| WO | 2022133866 A1 | 6/2022 |

OTHER PUBLICATIONS

Huawei, et al., "Discussion on AI/ML for CSI feedback enhancement," R1-2203141, 3GPP TSG RAN WG1 Meeting #109-e, e-Meeting, May 9-20, 2022, 7 pages.

* cited by examiner

APPARATUS AND METHOD FOR REPORTING CSI IN WIRELESS COMMUNICATION SYSTEM

CROSS-REFERENCE TO RELATED APPLICATION

This application is based on and claims priority under 35 U.S.C. § 119 to Korean Patent Application No. 10-2022-0095674, filed Aug. 1, 2022, in the Korean Intellectual Property Office, the disclosure of which is incorporated by reference herein in its entirety.

BACKGROUND

1. Field

The disclosure relates, in general, to a wireless communication system, and, in particular, to a method and apparatus for reporting channel state information (CSI) in the wireless communication system.

2. Description of Related Art

Considering the development of wireless communication from generation to generation, the technologies have been developed mainly for services targeting humans, such as voice calls, multimedia services, and data services. Following the commercialization of 5th generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μpec, and thus will be 50 times as fast as 5G communication systems and have the ¹/₁₀ radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Channel state information (CSI) may be used to measure a state of a channel between a user equipment (UE) and a base station in a wireless communication system. In this case, a CSI report timing may be adjusted to report the CSI more efficiently. Accordingly, a method for efficiently managing a CSI report configuration is considered.

SUMMARY

Various embodiments of the disclosure provide an apparatus and method capable of efficiently providing a service in a wireless communication system.

According to various embodiments of the disclosure, a method performed by a base station in a wireless communication system may include receiving, from a user equipment (UE), capability information indicating whether the UE supports generation of Artificial Intelligence (AI)-based channel state information (CSI), receiving, from the UE, information on a change in inference time related to the AI-based CSI generation and information on a change in a channel state, based on the capability information, identifying information on a CSI report timing, based on the information on the change in the inference time and the change in the channel state, transmitting, to the UE, radio resource control (RRC) configuration information including the identified CSI report timing, transmitting a CSI-reference signal (RS) to the UE, and receiving the CSI report from the UE, based on the CSI-RS and the information on the CSI report timing.

According to various embodiments of the disclosure, a method performed by a user equipment (UE) in a wireless communication system may include transmitting, to a base station, capability information indicating whether the UE supports generation of AI-based CSI, identifying state information of an AI chip which performs the AI-based CSI generation, identifying a change in inference time related to the AI-based CSI generation, based on the identified state information of the AI chip, transmitting, to the base station, information on the identified change in the inference time related to the CSI generation and information on the change in the channel state, receiving, from the base station, RRC configuration information including a CSI report timing, based on the information on the change in the inference time and the change in the channel state, receiving a CSI-RS from the base station, and transmitting the CSI report to the base station, based on the CSI-RS and the information on the CSI report timing.

According to various embodiments of the disclosure, a base station in a wireless communication system may include at least one transceiver, and at least one processor operatively coupled to the at least one transceiver. The at least one processor may be configured to receive, from the UE, capability information indicating whether the UE supports generation of AI-based CSI, receive, from the UE, information on a change in inference time related to the AI-based CSI generation and information on a change in a channel state, based on the capability information, identify information on a CSI report timing, based on the information on the change in the inference time and the change in the channel state, transmit, to the UE, RRC configuration information including the identified CSI report timing, transmit a CSI-RS to the UE, and receive the CSI report from the UE, based on the CSI-RS and the information on the CSI report timing.

According to various embodiments of the disclosure, a user equipment (UE) in a wireless communication system may include at least one transceiver, and at least one processor operatively coupled to the at least one transceiver. The at least one processor may be configured to transmit, to a base station, capability information indicating whether the UE supports generation of AI-based CSI, identify state information of an AI chip which performs the AI-based CSI generation, identify a change in inference time related to the AI-based CSI generation, based on the identified state information of the AI chip, transmit, to the base station, information on the identified change in the inference time related to the CSI generation and information on the change in the channel state, receive, from the base station, RRC configuration information including a CSI report timing, based on the information on the change in the inference time and the change in the channel state, receive a CSI-RS from the base station, and transmit the CSI report to the base station, based on the CSI-RS and the information on the CSI report timing.

Various embodiments of the disclosure provide an apparatus and method capable of efficiently providing a service in a wireless communication system.

In addition thereto, advantages acquired in the disclosure are not limited to the aforementioned advantages, and other advantages not mentioned herein may be clearly understood by those skilled in the art to which the disclosure pertains from the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to the description of the drawings, the same or similar reference numerals may be used to refer to the same or similar elements.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Terms (e.g., a controller, a processor, an artificial intelligence (AI) model, an encoder, a decoder, an autoencoder (AE), a neural network (NN) model, etc.) used hereinafter to refer to components of a device and terms (e.g., a signal, a feedback, a report (or reporting), information, a parameter, a value, a bit, a codeword, etc.) referring to data are exemplified for convenience of explanation. Therefore, the disclosure is not limited to the terms described below, and thus other terms having the same technical meaning may also be used.

In addition, although the disclosure describes various embodiments by using terms used in some communication standards (e.g., 3rd generation partnership project (3GPP)), this is for exemplary purposes only. Various embodiments of the disclosure may be easily modified and applied to other communication systems.

Figure 1:
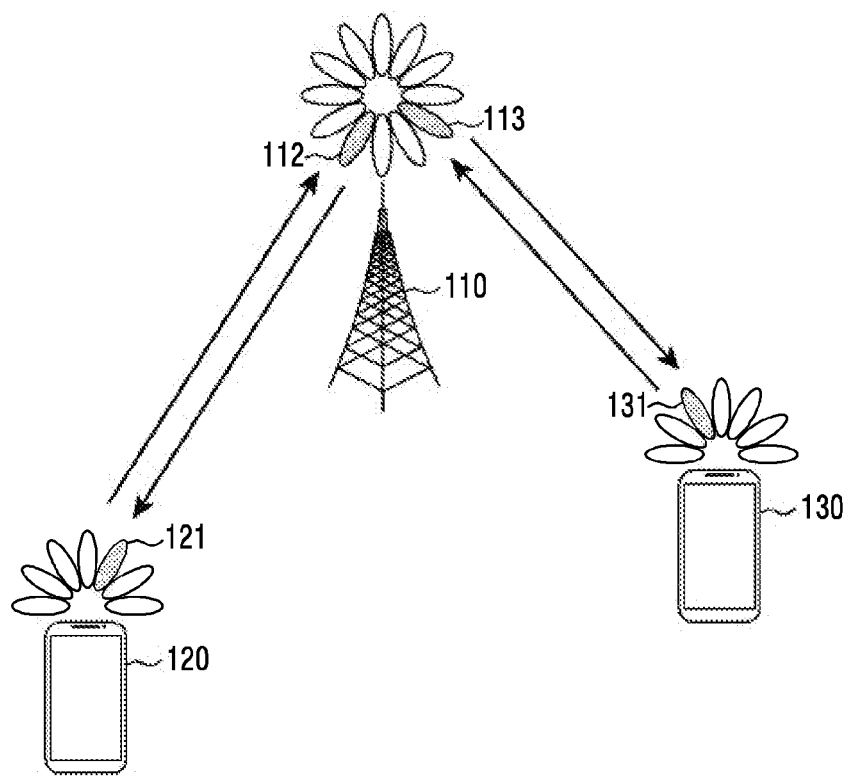
FIG. 1 illustrates a wireless communication system according to embodiments of the present disclosure.

FIG. 1 illustrates a wireless communication system according to various embodiments of the present disclosure. As part of nodes which use a radio channel, a base station 110, a terminal 120, and a terminal 130 are exemplified in the wireless communication system of FIG. 1. Although only one base station is illustrated in FIG. 1, other base stations identical or similar to the base station 110 may be further included.

The base station 110 is a network infrastructure which provides a radio access to the terminals 120 and 130. The base station 110 has a coverage defined as a specific geographic region, based on a distance capable of transmitting a signal. In addition to the term "base station," the base station 110 may be referred to as an "access point (AP)," an "eNodeB (eNB)," a "gNodeB (gNB)," a "5th generation (5G) node," a "6th generation (6G) node," a "wireless point," a "transmission/reception point (TRP)," or other terms having equivalent technical meanings.

As a device used by a user, each of the terminal 120 and the terminal 130 communicates with the base station 110 through the radio channel. Optionally, at least one of the terminals 120 to 130 may be operated without user involvement. That is, as a device for performing machine type communication (MTC), at least one of the terminals 120 to 130 may not be carried by the user. In addition to the term "terminal," each of the terminals 120 and 130 may be referred to as a "user equipment (UE)," a "mobile station," a "subscriber station," a "customer premises equipment (CPE)," a "remote terminal," a "wireless terminal," an "electronic device," a "user device," or other terms having equivalent technical meanings.

In addition, the base station 110, the terminal 120, and the terminal 130 may transmit and receive a radio signal at a millimeter wave (mmWave) band (e.g., 28 GHz, 30 GHz, 38 GHz, 60 GHz, over 60 GHz, etc.). In this case, to improve a channel gain, the base station 110, the terminal 120, and the terminal 130 may perform beamforming. Herein, the beamforming may include transmission beamforming and reception beamforming. That is, the base station 110, the terminal 120, and the terminal 130 may assign a directivity to a transmission signal and or a reception signal. For this, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a quasi co-located (QCL) relation with a resource used to transmit the serving beams 112, 113, 121, and 131.

Figure 2:
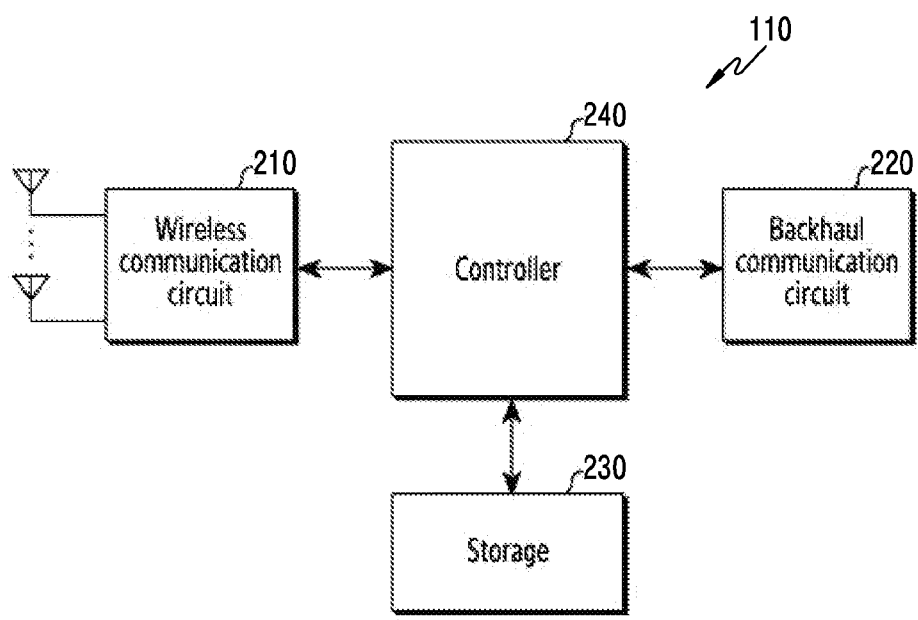
FIG. 2 illustrates an example for a structure of a base station in a wireless communication system according to embodiments of the present disclosure.

FIG. 2 illustrates an example for a structure of a base station in a wireless communication system according to embodiments of the present disclosure. According to various embodiments of the disclosure, the base station 110 may be referred to as a network for convenience. The exemplary structure of FIG. 2 may be understood as a structure of the base station 110. Hereinafter, the term " . . . unit," " . . . device," or the like implies a unit of processing at least one function or operation, and may be implemented in hardware or software or in combination of the hardware and the software.

Referring to FIG. 2, the base station 110 may include a wireless communication circuit 210, a backhaul communication circuit 220, a storage 230, and a controller 240.

The wireless communication circuit 210 performs functions for transmitting and receiving a signal through a wireless channel. For example, the wireless communication circuit 210 performs a function of conversion between a baseband signal and a bit-stream according to a physical layer standard of a system. For example, in data transmission, the wireless communication circuit 210 generates complex symbols by coding and modulating a transmission bit-stream. In addition, in data reception, the wireless communication circuit 210 restores a reception bit-stream by demodulating and decoding a baseband signal. In addition, the wireless communication circuit 210 up-converts a baseband signal into a Radio Frequency (RF) signal and thereafter transmits the RF signal through an antenna, and down-converts an RF signal received through the antenna into a baseband signal.

For this, the wireless communication circuit 210 may include a transmission filter, a reception filter, an amplifier, a mixer, an oscillator, a digital to analog converter (DAC), an analog to digital converter (ADC), or the like. In addition, the wireless communication circuit 210 may include a plurality of transmission/reception paths. Further, the wireless communication circuit 210 may include at least one antenna array constructed of a plurality of antenna elements. From a hardware aspect, the wireless communication circuit 210 may be constructed of a digital unit and an analog unit, and the analog unit may be constructed of a plurality of sub-units according to operating power, operation frequency, or the like.

The wireless communication circuit 210 may transmit and receive a signal. For this, the communication circuit 210 may include at least one transceiver. For example, the wireless communication circuit 210 may transmit a synchronization signal, a reference signal, system information, a message, a control message, a stream, control information, data, or the like. In addition, the wireless communication circuit 210 may perform beamforming.

The wireless communication circuit 210 transmits and receives a signal as described above. Accordingly, the wireless communication circuit 210 may be referred to as a transmitter, a receiver, or a transceiver. In addition, in the following description, transmission and reception performed through a wireless channel are used to imply that the aforementioned processing is performed by the wireless communication circuit 210.

The backhaul communication circuit 220 provides an interface for preforming communication with different nodes in a network. That is, the backhaul communication circuit 220 converts a bit-stream transmitted from the base station to a different node, e.g., a different access node, a different base station, an upper node, a core network, or the like, into a physical signal, and converts a physical signal received from the different node into a bit-stream.

The storage 230 stores data such as a basic program, application program, configuration information, or the like for an operation of the base station 110. The storage 230 may include a memory. The storage 230 may be constructed of a volatile memory, a non-volatile memory, or a combination of the volatile memory and the non-volatile memory. In addition, the storage 230 provides the stored data according to a request of the controller 240. According to an embodiment, the storage 230 may store learning data for an AI-based CSI report, and may apply the stored learning data to a neural network structure of the AI-based CSI report.

The controller 240 controls overall operations of the base station 110. For example, the controller 240 may transmit and receive a signal via the wireless communication circuit 210 or the backhaul communication circuit 220. In addition, the controller 240 writes data to the storage 230, and reads the data. Further, the controller 240 may perform functions of a protocol stack required in a communication standard. For this, the controller 240 may include at least one processor.

The structure of the base station 110 of FIG. 2 is only an example of the base station, and the example of the base station performing various embodiments of the disclosure is not limited to the structure illustrated in FIG. 2. That is, the structure may be added, deleted, or changed in part according to various embodiments.

Although the base station is described as one entity in FIG. 2, the disclosure is not limited thereto. The base station according to various embodiments of the disclosure may be implemented to constitute an access network having not only an integrated deployment but also a distributed deployment. According to an embodiment, the base station may be divided into a central unit (CU) and a digital unit (DU). The CU may be implemented to perform functions of upper layers (e.g., packet data convergence protocol (RRC)), and the DU may be implemented to perform functions of lower layers (e.g., medium access control (MAC), and Physical (PHY)). The DU of the base station may constitute beam coverage on a radio channel.

Figure 3:
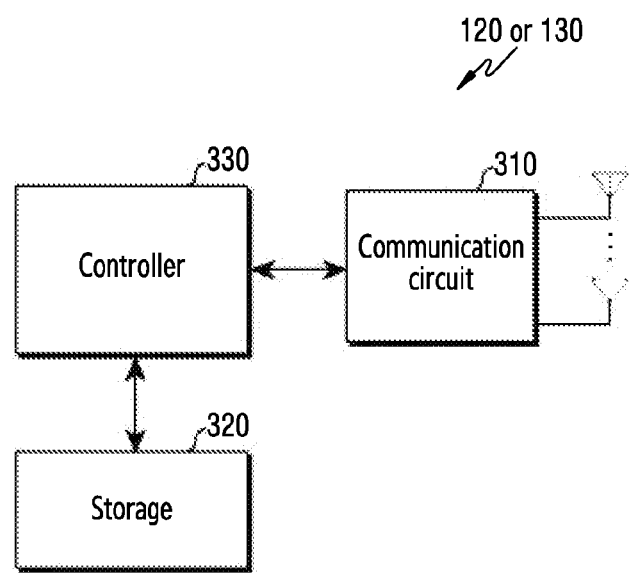
FIG. 3 illustrates a structure of a terminal in a wireless communication system according to embodiments of the present disclosure.

FIG. 3 illustrates a structure of a terminal in a wireless communication system according to embodiments of the present disclosure. The exemplary structure of FIG. 3 may be understood as a structure of the terminals 120 and 130. Hereinafter, the term " . . . unit," " . . . device," or the like implies a unit of processing at least one function or operation, and may be implemented in hardware or software or in combination of the hardware and the software.

Referring to FIG. 3, the terminals 120 and 130 may include a communication circuit 310, a storage 320, and a controller 330.

The communication circuit 310 performs functions for transmitting and receiving a signal through a wireless channel. For example, the communication circuit 310 performs a function of conversion between a baseband signal and a bit-stream according to a physical layer standard of a system. For example, in data transmission, the communication circuit 310 generates complex symbols by coding and modulating a transmission bit-stream. In addition, in data reception, the communication circuit 310 restores a reception bit-stream by demodulating and decoding a baseband signal. In addition, the communication circuit 310 up-converts a baseband signal into a radio frequency (RF) signal and thereafter transmits the RF signal through an antenna, and down-converts an RF signal received through the antenna into a baseband signal. For example, the communication circuit 310 may include a transmission filter, a reception filter, an amplifier, a mixer, an oscillator, a DAC, an ADC, or the like.

In addition, the communication circuit 301 may include a plurality of transmission/reception paths. Further, the communication circuit 301 may include an antenna unit. The communication circuit 301 may include at least one antenna array constructed of a plurality of antenna elements. From a hardware aspect, the communication circuit 301 may be constructed of a digital circuit and an analog circuit (e.g., a radio frequency integrated circuit (RFIC)). Herein, the digital circuit and the analog circuit may be implemented as one package. In addition, the communication circuit 301 may include a plurality of RF chains. In addition, the communication circuit 301 may perform beamforming. In order to assign a directivity depending on the setting of the controller 305 to a signal to be transmitted/received, the communication circuit 301 may apply a beamforming weight to the signal. According to an embodiment, the communication circuit 301 may include a radio frequency (RF) block (or RF unit). The RF block may include a first RF circuitry related to the antenna and a second RF circuitry related to baseband processing. The first RF circuitry may be referred to as RF-antenna (RF-A). The second RF circuitry may be referred to as RF-baseband (RF-B).

In addition, the communication circuit 301 may transmit/receive a signal. To this end, the communication circuit 301 may include at least one transceiver. The communication circuit 301 may receive a downlink signal. The downlink signal may include a synchronization signal (SS), a reference signal (RS) (e.g., cell-specific reference signal (CRS), demodulation (DM)-RS), system information (e.g., MIB, SIB, remaining system information (RMSI), other system information (OSI)), a configuration message, control information, or downlink data, etc. In addition, the communication circuit 301 may transmit an uplink signal. The uplink signal may include a random access-related signal (e.g., random access preamble (RAP) (message 1 (Msg1), message 3 (Msg3))), a reference signal (e.g., sounding reference signal (SRS), DM-RS), or a power headroom report (PHR), etc.

In addition, the communication circuit 301 may include different communication modules to process signals of different frequency bands. Further, the communication circuit 301 may include a plurality of communication modules to support a plurality of different radio access technologies. For example, the different radio access technologies may include a Bluetooth low energy (BLE), a wireless fidelity (WiFi), a WiFi gigabyte (WiGig), a cellular network (e.g., long term evolution (LTE), new radio (NR)), or the like. In addition, the different frequency bands may include a super high frequency (SHF) (e.g., 2.5 GHz, 5 GHz) band and a millimeter wave (e.g., 38 GHz, 60 GHz, etc.) band. In addition, the communication circuit 301 may use the same-type radio access technology on different frequency bands (e.g., an unlicensed band for licensed assisted access (LAA), citizens broadband radio service (CBRS) (e.g., 3.5 GHz)).

The communication circuit 301 transmits and receives a signal as described above. Accordingly, the communication circuit 301 may be referred to as a transmitter, a receiver, or a transceiver. In addition, in the following description, transmission and reception performed through a radio channel are used to imply that the aforementioned processing is performed by the communication circuit 301.

The storage 320 stores data such as a basic program, application program, configuration information, or the like for an operation of the terminal 120. The storage 320 may be constructed of a volatile memory, a non-volatile memory, or a combination of the volatile memory and the non-volatile memory. In addition, the storage 320 provides the stored data according to a request of the controller 330. According to an embodiment, the storage 320 may store learning data for the AI-based CSI report, based on a CSI report format configured by the base station.

The controller 330 controls overall operations of the terminals 120 and 130. For example, the controller 330 may transmit and receive a signal via the communication circuit 310. In addition, the controller 330 writes data to the storage 320, and reads the data. Further, the controller 330 may perform functions of a protocol stack required in a communication standard. For this, the controller 330 may include at least one processor. The controller 330 may include at least one processor or micro-processor, or may be part of the processor. In addition, part of the communication circuit 310 and the controller 330 may be referred to as a communication processor (CP). The controller 330 may include various modules for performing communication. According to various embodiments, the controller 330 may control the terminal to perform operations according to various embodiments described below.

Although not shown in FIG. 3, according to various embodiments of the disclosure, the terminals 120 and 130 may further include a measurement unit for an AI chip. According to an embodiment, the measurement unit included in the terminal may detect a state of the AI chip (e.g., including various physical parameters of the AI chip) including temperature of the AI chip. According to an embodiment, the state of the AI chip, detected by the measurement unit, may affect a computation performed by the AI chip. According to an embodiment, the controller 330 may monitor state information on the AI chip on a real-time basis, based on the state of the AI chip detected by the measuring unit or a scheduling state configured in the terminal from the base station. The controller 330 may measure a change in computation inference time, based on state information on the AI chip, monitored on the real-time basis.

In an embodiment, the AI model learned based on a neural network may be operated through the controller 330 and the storage 320. In this case, the controller 330 may be constructed of one or more processors. The one or more processors may include a function of a general-purpose processor such as a central processing unit (CPU), an application processor (AP), a digital signal processor (DSP), or the like, a graphic-dedicated processor such as a graphics processing unit (GPU) and a vision processing unit (VPU), or an AI-dedicated processor such as a neural processing unit (NPU). The one or more processors may provide control to process input data according to a predefined operation rule or AI model stored in the storage 320. Alternatively, when the one or more processors are the AI-dedicated processors, the AI-dedicated processors may be designed with a hardware structure specialized for processing a specific AI model. The AI-dedicated processor may not be included in the controller 330, and may be included as a separated component.

According to an embodiment, the predefined operation rule or AI model is characterized as being created through learning. Herein, being created through leaning means that a basic AI model is learned by using a plurality of pieces of learning data according to a learning algorithm so that the predefined operation rule or AI model is created to perform a desired feature (or purpose). The learning may be achieved by a device itself in which AI according to the disclosure is performed, or may be achieved by a separate server and/or system. Examples of the learning algorithm include supervised learning, unsupervised learning, semi-supervised learning, or reinforcement learning, but are not limited to the aforementioned examples. The controller 330 may learn an event which is to occur, a decision which is made, and information which is collected or input, through the learning algorithm. The controller 330 may store such a learning result in the storage 320 (e.g., a memory).

The AI model may be constructed of a plurality of neural network layers. Each of the plurality of neural network layers has a plurality of weight values, and performs a neural network computation through a computation between a computation result of a previous layer and the plurality of weight values. The plurality of weight values of the plurality of neural network layers may be optimized by a learning result of the AI model. For example, the plurality of weight values may be updated to decrease or optimize a loss value or cost value obtained from the AI model during the learning process. An artificial neural network may include a deep neural network (DNN), for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, or the like, but is not limited to the aforementioned examples.

In an embodiment, the controller 330 may execute an algorithm for performing an operation related to an AI-based channel state information (CSI) report or feedback. In an embodiment, the AI model learned to perform the AI-based CSI feedback may be constructed as hardware in the controller 330, included as software, or constructed through hardware and software combinations. In other words, the controller 330 may include an AI-based CSI feedback controller. The AI-based CSI feedback controller may determine whether to monitor the AI model performing the AI-based feedback, determine whether to report a monitoring result, determine whether the AI model performing the AI-based CSI feedback fails, or determine whether to use the AI-based CSI feedback. In addition, according to various embodiments, the controller 330 may include an update unit.

The update unit may obtain data updated by a learning procedure between the terminal and the base station (e.g., data related to the CSI feedback between the terminal and the base station), and may reconstruct a value of parameters (e.g., a neural network structure, information for each node layer, weight value information between nodes) constituting a neural network based on the data. The AI-based CSI feedback controller and the update unit may be commands/codes residing in the controller 330 or a storage space for storing the commands/codes, as command sets or codes stored in the storage 320, or may be part of a circuitry constituting the controller 330. According to various embodiments, the controller 330 may control the terminals 120 and 130 to perform operations according to various embodiments.

The structure of the terminals 120 and 130 of FIG. 3 is only an example of the terminal, and the example of the terminal performing various embodiments of the disclosure is not limited to the structure illustrated in FIG. 3. That is, the structure may be added, deleted, or changed in part according to various embodiments.

For convenience of explanation, the following descriptions are based on an AI model included in the terminals 120 and 130. That is, the AI model including a specific neural network structure and learned by a specific algorithm may be included in the terminals 120 and 130. However, the disclosure is not limited thereto, and may also be applied to an AI model included in the base station 110.

A technique related to the AI-based CSI feedback may include performing of learning and configuration to apply a CSI feedback to a specific AI model, based on a specific algorithm, collecting of learning data required in the process of learning the specific AI model, and verifying of performance of the learned specific AI model. In particular, in regard to the verifying of the performance of the learned specific AI mode, the disclosure may further include an operation in which the terminal monitors the AI model and reports a monitoring result to perform the CSI feedback through an optimal AI model.

In describing of the CSI report method based on the AI model of the disclosure, an autoencoder (AE) is taken for example as the AI model for convenience of explanation. However, the disclosure is not limited thereto, and is obviously applicable to all AI models capable of CSI compression in performing the CSI report. Herein, the AE may mean an AI model including a bottleneck structure, as a structure having the same input and output. The AE may compress CSI measured by the terminal in the form of a low-dimensional vector. In other words, the terminal may generate a compressed CSI through an encoder of the AE by using a measured full CSI, and may transmit the compressed CSI to the base station. Accordingly, the base station may receive an explicit CSI feedback, not an implicit CSI feedback. The AE may have an advantage in regard to reporting through a CSI compression scheme.

For example, the AE may accurately evaluate an AI model even when the AE infers performance of the AI model since a ground-truth of original data is known. That is, since an input value of the AE is known, the performance of the AE may be measured by comparing an output value and input value of the AE. In case of an AE which knows a real value of the original data, which value may be output may be accurately predicted according to a value input to the AE. In addition, since the AE highly depends on data, the AE may also be used in anomaly detection which detects unlearned data. However, since the AE (or the AI model) is an AI model based on data, performance stability may deteriorate. Therefore, the terminal may request the base station to perform a procedure for monitoring and reporting accuracy (or reliability) of the AE.

Figure 4:
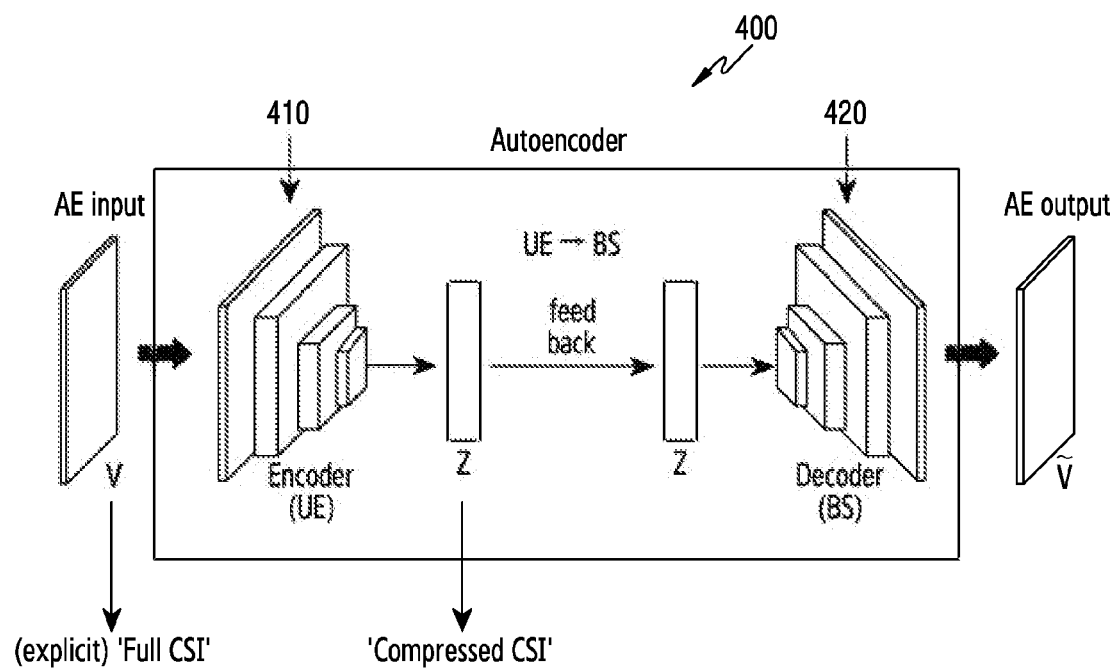
FIG. 4 illustrates a process of reporting CSI using an AI model in a wireless communication system according to embodiments of the present disclosure.

FIG. 4 illustrates a process of reporting CSI using an AI model in a wireless communication system according to embodiments of the present disclosure. Although an autoencoder is described for example as the AI model for the CSI report (or CSI feedback), the disclosure is not limited thereto. Herein, it is assumed that the autoencoder for the CSI report is an AI model in which learning has been performed for reporting the CSI, based on a specific learning algorithm.

Referring to FIG. 4, an autoencoder 400 may be an AI model learned for a CSI report or feedback between a user equipment (UE) and a base station (BS). The UE may generate the CSI by pre-processing information on a channel estimated based on a result of measuring a signal received from the BS. For example, the pre-processing may include eigen value decomposition (EVD) or singular value decomposition (SVD). Herein, the generated CSI may mean a full CSI. The full CSI may be input to an encoder 410 of the UE which is an input of the autoencoder 400, and thus a compressed CSI may be generated. The UE may transmit the compressed CSI to the BS, and the BS may restore the compressed CSI through a decoder 420. In this case, the decoder 420 of the BS may be an output of the autoencoder 400. According to the aforementioned description, the autoencoder 400 may learn the CSI compression which may be used in the CSI feedback between the UE and the BS. The autoencoder 400 may perform an explicit CSI feedback, not an implicit CSI feedback, through a feedback based on the learned CSI compression method. The CSI compression method may require stable performance and high accuracy of the autoencoder 400.

Therefore, according to an embodiment, the UE requires a procedure of managing the autoencoder 400 by reporting to the BS an evaluation result obtained by monitoring performance of the autoencoder 400 persistently and periodically. Based on the aforementioned description, an operation for more efficiently performing a CSI report based on an AI mode will be described according to various embodiments of the disclosure. Hereinafter, the CSI described for this may mean at least one of the full CSI and the compressed CSI.

According to various embodiments of the disclosure, an AI chip included in the UE or BS may perform various functions including the aforementioned CSI compression. Without being limited to the autoencoder for CSI compression, the various functions performed by the AI chip may include a physical layer function, a modem function, an application processor (AP) function, or the like, related to the AI. According to an embodiment, various AI algorithms may be performed depending on the various functions to be performed. However, the various AI-related functions may have individually different features, such as an amount of computation to be executed in respective AI chips, scheduling of the AI algorithms, or the like. In a case where the various functions of the AI chips having the individual features are included in the same AI chip when the computation is performed, it may affect mutual computations.

Accordingly, even if the same function is performed in the AI chip, a timing at which the computation based on the AI algorithm is complete may be different each time. In order to solve the aforementioned problem, the AI-related functions to be performed may be controlled to operate by being included in individual chips, which may cause significant cost burden and physical limitations. Therefore, the disclosure discloses various embodiments on the premise that various AI-related functions are performed in a shared AI chip for hardware and cost efficiency.

In a case where the various AI-related functions are performed in the shared AI chip, as described above, it may not be able to accurately predict a timing at which a computation is complete when CSI compression and report operations of the autoencoder are performed as one of the AI-related functions. For example, when it is not able to accurately predict a timing at which a computation for CSI compression of the UE is complete, an AI computation may not be complete at a timing set to the UE to generate and compress CSI (hereinafter, interchangeably referred to as a "CSI computation") and to report this. In this case, there may be a situation where the UE requests again the BS to provide a resource for the CSI report or abandon a CSI report for a corresponding channel, which may cause waste of resources and a delay problem.

In order to solve the aforementioned problem, the disclosure provides a method and apparatus capable of adaptively determining and configuring a CSI compression report timing, in a situation where a CSI computation timing varies depending on a computation resource change of an AI chip shared by other AI functions.

Figure 5:
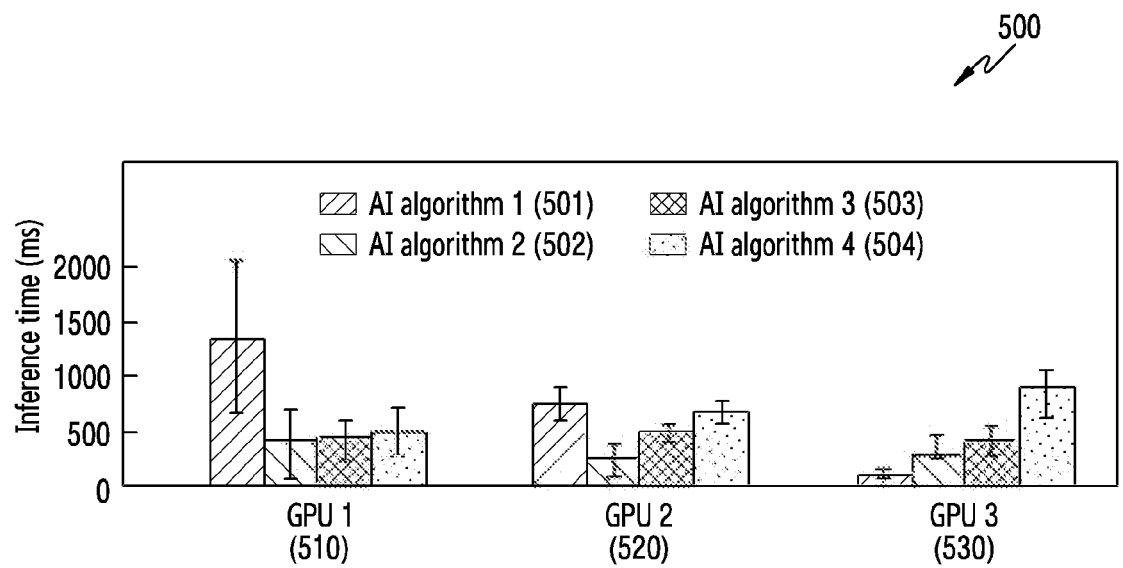
FIG. 5 illustrates an example in which computation inference time of a GPU chip varies depending on an AI algorithm in a wireless communication system according to embodiments of the present disclosure.

FIG. 5 illustrates an example in which computation inference time of a graphics processing unit (GPU) chip varies depending on an AI algorithm in a wireless communication system according to embodiments of the present disclosure. More specifically, a graph 500 of FIG. 5 illustrates a change in computation inference time, which occurs when each GPU chip is shared by various AI algorithms. According to various embodiments of the disclosure, the "change in the computation inference time" described hereinafter may be referred to as various terms having the same or similar meaning within the scope of the disclosure, such as a "change in the inference time," "time change information," "time information," "computation information," or the like. According to an embodiment, the "change in the inference time" may mean uncertainty of a computation complete timing depending on an AI function to be added (or deleted, changed) with respect to non-AI-based functions (or AI-based functions). According to an embodiment, the "change in the inference time" which means uncertainty of the computation complete timing depending on the AI function may include a single value or range of values including a unit of time. Alternatively, without being limited thereto, it is obvious that it may also include information including a numerical value.

Referring to FIG. 5, a vertical axis of the graph 500 represents computation inference time (ms) of each AI algorithm, and a horizontal axis represents different GPU chips (a GPU1 510, a GPU2 520, a GPU3 530). According to an embodiment, each AI algorithm may be not only an algorithm applied for the same AI function (e.g., CSI compression, etc.) but also an algorithm applied for different AI functions.

According to an embodiment, the AI chip of the disclosure may include the GPU chip of FIG. 5. Unlike a central processing unit (CPU) including several processing cores and constructed of millions of transistors, the GPU may be a processor constructed of a smaller and more specialized core than the CPU. The CPU and the GPU are common as important computing engines for processing data, but the GPU chip may be more appropriate for deep learning and AI training for large-volume specific data sets, such as multiple neural network layers or 2-dimensional (2D) images. Therefore, in order to execute a wide range of workloads such as deep learning or AI, the GPU may be more preferred as a shared chip for performing various AI algorithms. However, according to various embodiments of the disclosure, this is only an example, and the shared AI chip is not limited to the GPU chip, and obviously, the shared AI chip may include various processor chips capable of performing AI algorithms similar or equivalent thereto.

Referring to FIG. 5, each of AI algorithms 501, 502, 503, and 504 may have a different computation inference time in case of being implemented in the GPU1 chip 510, in case of being implemented in the GPU2 chip 520, or in case of being implemented in the GPU3 chip 530. In addition, each GPU chip may have a different computation inference time required by each AI algorithm. The computation inference time may be diverse for reasons of GPU contention, queuing delay, or the like. As described in FIG. 5, even if the algorithm performs the same AI function, the computation inference time may vary for each shared AI chip, or the computation reasoning time may vary depending on the AI algorithms sharing the AI chip. As described above, the change in the computation inference time for the AI function may cause a problem in a fixed CSI report timing situation. To solve this problem, various embodiments of the disclosure disclose a method and apparatus for adaptively determining and configuring a CSI report timing based on a channel state and the change in the computation inference time.

Figure 6:
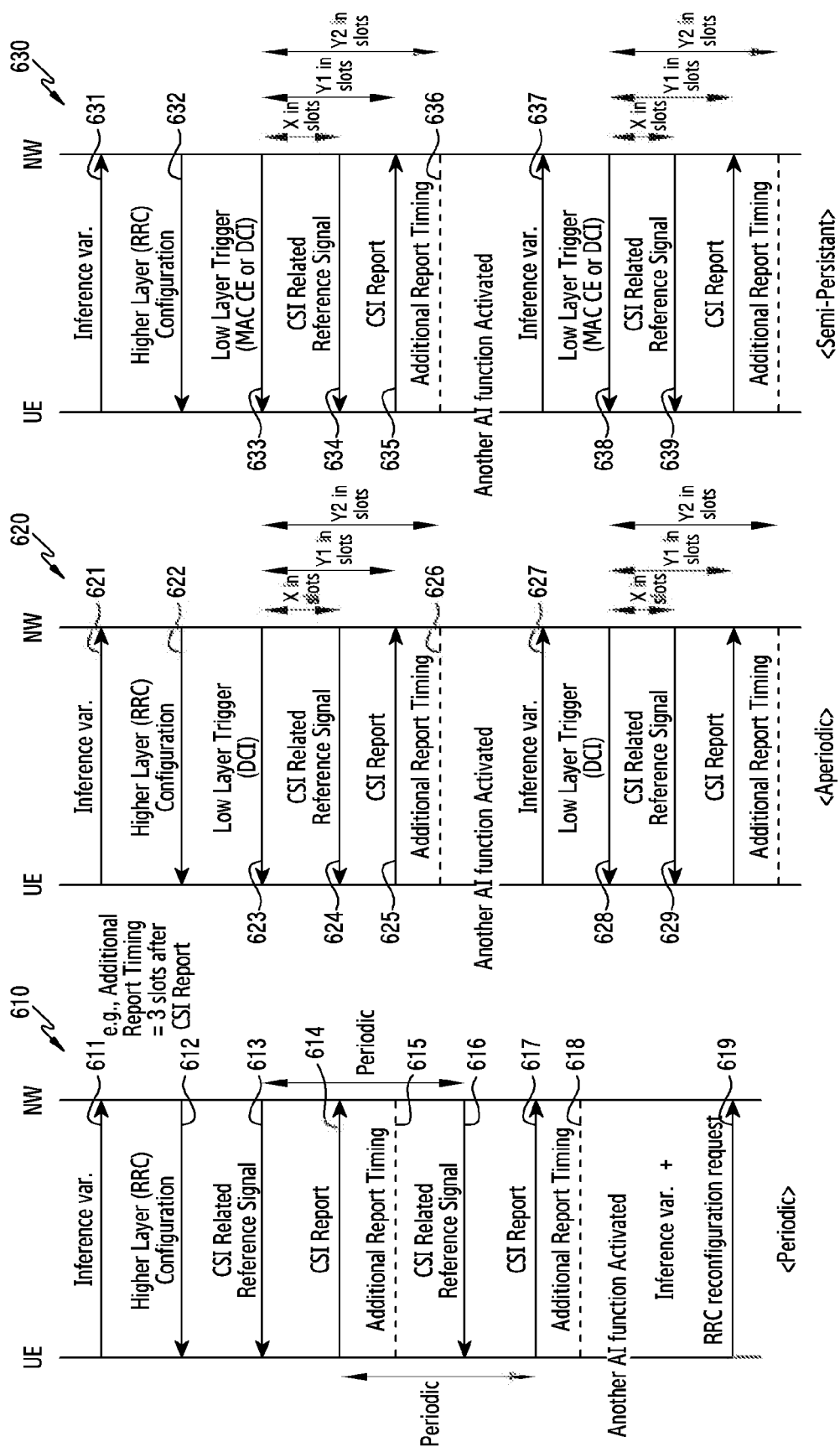
FIG. 6 illustrates a signal flow for a CSI report of a terminal and a base station in a wireless communication system according to embodiments of the present disclosure.

FIG. 6 illustrates a signal flow for a CSI report of a UE and a BS in a wireless communication system according to embodiments of the present disclosure. More specifically, with reference to FIG. 6, a flow diagram 610 illustrates a signal flow for a periodic CSI report of the UE and the BS, and a flow diagram 620 illustrates a signal flow for an aperiodic CSI report of the UE and the BS. In addition, a flow diagram 630 illustrates a signal flow for a semi-persistent CSI report of the UE and the BS. However, without being limited thereto, it is obvious that each step for the CSI report according to various embodiments of the disclosure is also applicable to various CSI reports between the UE and the BS as long as it is clearly understood by ordinarily skilled in the art. In addition, according to various embodiments of the disclosure, at least one of all, some, or combinations of some of steps described below may be included, and it is obvious that some combinations of the steps for the periodic, aperiodic, or semi-persistent CSI report are possible within an implementable range. Hereinafter, operations for the CSI report are described by including all signal flows for the periodic, aperiodic, and semi-persistent CSI reports.

Although not shown in FIG. 6, according to an embodiment, the UE may transmit, to the BS, capability information including information whether the AI function is supported. The capability information transmitted by the UE may include information on whether the UE is capable of generating and reporting an AI-based CSI. The capability information transmitted by the UE may be information periodically reported to the BS, or may be information reported to the BS based on a request of the BS. According to an embodiment, the capability information reported by the UE may be transmitted through higher layer signaling (e.g., RRC signaling) or a MAC CE.

According to an embodiment, the BS which has received the capability information from the UE may identify whether the UE supports the AI function including an AI-based CSI operation (CSI generation or reporting). When the UE does not support the AI function, the BS may transmit configuration information related to a non-AI-based CSI report to the UE. When the UE supports the AI function, the BS may further transmit configuration information related to the AI-based CSI report or configuration information on a report of a computation inference time change (hereinafter, interchangeably referred to as a report of an inference time change). According to an embodiment, the configuration information transmitted by the BS may be transmitted through at least one of the higher layer signaling (e.g., RRC signaling), the MAC CE, and downlink control information (DCI).

According to an embodiment, the BS may configure the UE to report the inference time change periodically in accordance with a determined timing, based on the configuration information related to the report of the inference time change. According to an embodiment, the BS may configure the UE to detect a state of an AI chip and report the inference time change when a trigger condition is satisfied, based on the configuration information related to the report of the inference time change. According to various embodiments of the disclosure, without being limited to the aforementioned configuration information, it is obvious that the UE is able to report the inference time change (e.g., when it is pre-configured in the UE) irrespective of the configuration information of the BS.

According to various embodiments of the disclosure, the aforementioned steps for transmitting the capability information of the UE or transmitting the configuration information on the report of the inference time change of the BS may be applied to all or some of the flow diagram 610, the flow diagram 620, and the flow diagram 630 or may be omitted.

Referring to FIG. 6, in step 611, 621, or 631, the UE may transmit information on the change in the inference time to the BS. According to an embodiment, the UE may further transmit, to the BS, information on a channel state in addition to the information on the change in the inference time. According to an embodiment, the change in the inference time of the disclosure may include a CSI report timing which varies, when an AI function including AI-based CSI compression has to be performed, in comparison with a timing at which CSI is reported based on general CSI configuration information.

According to an embodiment, the change in the inference time may include a single value or may include a plurality of values (e.g., Nms to Mms, where N and M are positive integers, N<M)) depending on an AI algorithm applied to the AI function (e.g., AI-based CSI compression, etc.). When the change in the inference time includes the single value, the single value may be one value representing a plurality of values depending on the AI algorithm, and may be, for example, at least one of a sum of the plurality of values, a weighted sum, an average value, and a highest value. The information on the change in the inference time, transmitted by the UE to the BS, may include a change in inference time for an AI-based CSI report or a change in inference time for various AI functions performed in the AI chip of the UE. The information on the change in the inference time, transmitted by the UE, may include computation time required to generate the AI-based CSI.

In addition, the information on the change in the inference time, transmitted by the UE, may include a difference value (or an offset) with respect to the computation time for generating the AI-based CSI (or a time for generating a non-AI-based CSI) required previous to the report, or may include an absolute value of the computation time for generating the AI-based CSI. Alternatively, the information on the change in the inference time, transmitted by the UE, may include information on a quantized value which divides a difference value for each section, with respect to the computation time for generating the AI-based CSI (or a time for generating a non-AI-based CSI) required previous to the report.

According to an embodiment, the UE may measure the computation time for generating the CSI, based on a state of the AI chip performing the AI functions. As shown in FIG. 5, even in case of the same AI function (e.g., CSI compression, etc.), the computation time may be determined variously depending on an algorithm to be applied. The UE may identify the state of the AI chip to measure the computation time for compressing and generating the CSI. According to an embodiment, the UE may detect temperature of the AI chip or a change in the temperature. Alternatively, the UE may identify various AI functions being executed in the AI chip or scheduling of the algorithm to be applied to the various AI functions. The state of the AI chip, identified by the UE, may include physical property information (e.g., temperature or a change in the temperature, etc.) of the aforementioned AI chip or information on the algorithm of the AI functions. The UE may identify the state of the AI chip on a real-time basis, and may identify the computation time for generating the AI-based CSI, based on the identified state of the AI chip.

According to an embodiment, the UE may have information on pre-set inference time. The information on the inference time pre-set to the UE may include a combination of each of pre-measured AI functions and inference time information of the AI functions. Alternatively, the information on the pre-set inference time may include a mapping relationship of each of the pre-measured AI functions and the inference time information for each of the AI functions. According to an embodiment, the UE may identify the computation time for generating the AI-based CSI, based on the information on the pre-set inference time and the AI functions implemented in the AI chip.

According to an embodiment, the UE may identify the information on the inference time change, based on the computation time for generating the identified AI-based CSI. The UE may transmit the information on the identified inference time change to the BS. According to an embodiment, the UE may transmit the information on the inference time change to the BS, based on configuration information related to the inference time change report received from the BS. According to an embodiment, the UE may transmit the information on the inference time change to the BS, when a trigger condition is satisfied, based on the configuration information related to the inference time change report received from the BS. The trigger condition may be any reference value related to the state of the AI chip, detected by the UE. For example, the trigger condition configured to the UE by the BS may include one of a case where temperature of the AI chip exceeds a specific value, a case where the number of AI functions scheduled in the AI chip exceeds a specific reference, and a case where the computation time for generating the identified AI-based CSI exceeds a specific reference. According to an embodiment, the information on the change in the inference time, transmitted by the UE, may be transmitted through at least one of the higher layer signaling (e.g., RRC signaling), the MAC CE, and the DCI.

In step 612, 622, or 632, the BS may identify and transmit configuration information for the CSI report to the UE. Although transmission of the configuration information through higher layer signaling (e.g., RRC signaling) is illustrated in FIG. 6, the disclosure is not limited thereto, and according to an embodiment, the BS may obviously transmit the configuration information through the MAC or the DCI, and may transmit it not only through a downlink control channel but also a data channel. According to an embodiment, the BS may further transmit, to the UE, additional configuration information identified based on the information on the inference time change, in addition to the configuration information related to the general CSI report.

According to an embodiment, in case of the aperiodic CSI report (see 620) or the semi-persistent CSI report (see 630), the configuration information for the CSI report, transmitted by the BS to the UE, may include information instructing to receive a CSI-Reference Signal (RS) and report the CSI, based on a trigger signal (e.g., MAC CE or DCI) received by the UE from the BS. According to various embodiments of the disclosure, in the aperiodic CSI report (see 620) or the semi-persistent CSI report (see 630), the configuration information for the CSI report transmitted by the BS to the UE may include an indicator (e.g., an indicator for an offset) such as n slots after a trigger signal in regard to a CSI-related transmission/reception operation timing of the UE.

According to an embodiment, the BS may compare information on the inference time change, received from the UE, or a change in a channel state with a threshold. The BS may identify a timing for the CSI report, based on a comparison result. According to an embodiment, a case where the change in the channel state is not significant may include a case where channel coherence time is long. According to an embodiment, the change in the channel state may be determined based on whether the channel is stable or mobility of the UE. According to an embodiment, the change in the channel state may be identified based on an uplink signal (e.g., a sounding reference signal (SRS)) transmitted by the UE to the BS. According to an embodiment, all threshold values described below are not limited to the same threshold value, and may include respective different values. In case of "exceeding" may include "being greater than or equal to."

According to an embodiment, when the change in the inference time for CSI generation (e.g., compression and generation) is less than the threshold value, the BS may perform a CSI report procedure without having to configure an additional CSI report timing. That is, the BS may transmit configuration information (e.g., configuration information for a non AI based CSI report) to the UE, without the configuration for the additional CSI report timing. For example, the BS may determine that the inference time for the AI-based CSI generation (e.g., compression and generation) does not have significant effect on the CSI report timing to be originally configured by the BS, and may not perform the configuration for the additional CSI report timing in addition to the configuration of a general CSI report timing.

According to an embodiment, when the change in the inference time for CSI generation (e.g., compression and generation) is greater than the threshold value but the change in the channel state is less than a specific value (e.g., when the channel coherent time is greater than the specific value), the BS may change a CSI report timing, based on the information on the inference time change. According to an embodiment, when the change in the inference time for CSI generation (e.g., compression and generation) is greater than the change in the channel state (e.g., the channel coherent time), the BS may identify an additional CSI report offset in addition to the existing CSI report offset, based on the information on the inference time change. According to an embodiment, in case of the periodic CSI report, the BS may change a CSI report timing, by increasing a period for CSI-RS transmission and CSI reporting.

Alternatively, the BS may change the CSI report timing by deferring the offset for the CSI report. According to an embodiment, in case of the aperiodic CSI report (see 620) or the semi-persistent CSI report (see 630), the BS may change the CSI report timing by instructing to perform the CSI report in n slots after a trigger signal, based on the received information on the change in the inference time. According to an embodiment, the BS may identify a value having a greatest change in each AI algorithm as a value of the change in the inference time, based on the received information on the change in the inference time, and may identify the identified value of the change in the inference time as a changed CSI report timing in addition to the existing CSI report timing.

Since there is a relatively low need to immediately perform the CSI report in an environment in which the channel state does not change rapidly, the BS may identify a timing obtained by adding a value of the inference time change to the existing CSI report timing and allocate the timing to the UE, instead of configuring an additional CSI report, thereby efficiently performing a process for resource allocation. According to an embodiment, the BS may transmit configuration information to the UE by including information, which instructs the UE to be able to perform the CSI report, into the identified changed CSI report timing. The configuration information may be transmitted to the UE by being included in the higher layer configuration process of the aforementioned steps 612, 622, and 632.

According to an embodiment, when the change in the inference time for CSI generation (e.g., compression and generation) is greater than the threshold value and the change in the channel state is greater than a specific value (e.g., when the channel coherent time is less than the specific value), the BS may identify an additional CSI report offset in addition to the existing CSI report offset, based on the information on the inference time change. In a case where there is a great change in the channel state, it may be difficult to reallocate the CSI report when the CSI report timing is deferred or missed. Therefore, the BS may identify an offset for an additional CSI report. According to an embodiment, in regard to AI-based CSI generation (e.g., compression and generation), the UE may not be able to complete a CSI computation (e.g., compression and generation) at a timing for a first CSI report configured by the BS. In this case, the UE may not be able to perform the CSI report at the allocated timing of the first CSI report.

However, when an offset (e.g., a timing for a second CSI report) for an additional CSI report is configured, the UE may perform the CSI report at a timing for the second CSI report. For example, when the inference time change is 2 ms to 5 ms, the BS may identify an additional CSI report timing offset corresponding to 2 ms and 5 ms in addition to the CSI report timing. According to an embodiment, when the UE is able to perform the CSI report, based on the timing for the first CSI report, the BS may reallocate to the UE a resource to which the timing for the second CSI report is allocated. According to an embodiment, in order to indicate the timing of the second CSI report, the BS may transmit information related to the additional CSI report timing. For example, the information related to the additional CSI report timing, transmitted by the BS, may include an indicator indicating n slots after the first CSI report timing.

In addition, the number of additional CSI reporting timings is not limited to one, and the information related to the CSI report timing, transmitted by the BS, may include a plurality of additional CSI report timings and indicators for them. The configuration information may be transmitted to the UE by being included in the higher layer configuration process of the aforementioned steps 612, 622, and 632.

According to an embodiment, the BS may transmit information on the additional CSI report timing in advance to the UE (e.g., RRC signaling), before receiving the information on the inference time change from the UE. According to an embodiment, the BS may configure the information on the additional CSI report timing configured in advance to the UE before performing (e.g., generating and compressing) the AI-based CSI, or may configure the information through a reconfiguration process while performing the AI-based CSI. When information on the change in the inference time identified by the UE is reported to the BS, the UE for which the information on the additional CSI report timing is configured in advance may identify the additional CSI report timing, based on information on a change in the identified inference time and information configured from the BS.

For example, the information on the additional CSI report timing configured in advance for the UE by the BS may include an additional report timing indicator. When the indicator is set to 0, the UE may identify a lowest value (e.g., 2 ms) of the inference time change (e.g., 2 ms to 5 ms) as a first report timing and identify a highest value (e.g., 5 ms) as a second report timing, and may report CSI, based on the identified report timings. When the indicator is set to 1, the UE may identify an average value (e.g., 3.5 ms) of the inference time change (e.g., 2 ms to 5 ms) as the first report timing and identify the highest value (e.g., 5 ms) as the second report timing, and may report the CSI, based on the identified report timings. However, this is only an example, and obviously, the information on the CSI report timings to be configured in advance to the UE and the indicator included in the information may be implemented with a variety of parameters or content.

According to an embodiment, the BS may transmit configuration information including the information on the identified additional CSI report timing to the UE in addition to the CSI report offset. According to an embodiment, the BS may transmit a control indication related to the information on the identified additional CSI report timing to the UE.

According to an embodiment, when the change in the inference time for CSI generation (e.g., compression and generation) is greater than the threshold value and the change in the channel state is greater than a specific value (e.g., when the channel coherent time is less than the specific value), the BS may deactivate an AI-based CSI feedback (e.g., AI-based CSI compression and generation). According to an embodiment, the threshold value for the change in the inference time may include a threshold value to prepare for a change in inference time too great to identify a report timing for an AI-based CSI report. When the change in the inference time includes a significantly great value, the BS may identify that it is not able to support an AI-based CSI compression operation of the UE, and thus may instruct the UE to deactivate the AI-based CSI function.

According to an embodiment, after the AI-based CSI function is deactivated, the BS may receive information on the change in the inference time again from the UE and may compare this with a threshold value. The BS may identify whether to activate the AI-based CSI function, based on a comparison result between the change in the inference time or the change in the channel state and each threshold value. When a specific condition is satisfied, the BS may instruct the UE to activate the AI-based CSI function, and the steps of FIG. 6 may be performed again.

According to an embodiment, the BS may identify CSI report categories, based on the information on the change in the inference time, received from the UE. Obviously, the BS may identity the CSI report categories irrespective of the information on the change in the inference time. The CSI report categories identified by the BS may include information on UEs classified based on a specific criterion. The CSI report categories may include information on individual report timing. For example, a category A may include information for indicating to have an additional CSI report timing offset after n slots, or a category B may include information for indicating to change the CSI report timing after n slots. However, this is only one example, and information (an operation for a CSI report) on a CSI report indicated by the BS and included in one category may be unified or may include specifically separate information.

According to an embodiment, the BS may identify a CSI report category corresponding to the UE among the CSI report categories, based on capability information received from the UE, and may transmit information on the identified CSI report category to the UE. According to an embodiment, the BS may identify the CSI report category corresponding to the UE among the CSI report categories, based on the information on the change in the inference time, received from the UE, and may transmit information on the identified CSI report category to the UE.

In step 613, 624, or 634, the BS may transmit a reference signal related to CSI to the UE. The reference signal transmitted by the BS may be a CSI-RS, but is not limited to this embodiment. For example, it is obvious that an operation utilizing a Synchronization Signal Block (SSB) instead of the CSI-RS illustrated and described with reference to FIG. 6 is also included in embodiments of the disclosure. According to an embodiment, the BS may periodically transmit the CSI-RS to the UE. In case of the aperiodic CSI report (see 620) or the semi-persistent report (see 630), in step 623 or 633, the BS may transmit a trigger signal for transmitting the CSI-RS in advance. According to an embodiment, the trigger signal transmitted by the BS may include a MAC CE or DCI.

According to an embodiment, in case of the aperiodic CSI report (see 620), the CSI report of the UE may be triggered by the DCI. According to an embodiment, in case of the aperiodic CSI report (see 620), the CSI report of the UE may be triggered by a subselection indicator of the MAC CE and DCI. According to an embodiment, in case of the semi-persistent report (see 630), the CSI report of the UE may be performed by an activation command, based on the MAC CE. According to an embodiment, in case of the semi-persistent CSI report (see 630), a CSI report related to a data channel of the UE may be triggered by the DCI.

According to an embodiment, the trigger signal transmitted by the BS may be a signal used as a reference offset to indicate at least one of a transmission/reception timing of the CSI-RS, a report timing of the CSI, and an additional report timing of the CSI.

In step 614, 625, or 635, the UE may transmit a CSI report to the BS. According to an embodiment, the CSI report transmitted by the UE to the BS may be CSI compressed by AI-based CSI generation. According to an embodiment, the UE may perform the CSI report, based on configuration information for the CSI report received from the BS. According to an embodiment, the UE may perform the CSI report, based on the configuration information including at least one of operations for the CSI report identified by the BS in step 622 or 632. According to an embodiment, the UE may transmit the CSI report in accordance with a general CSI report procedure, without additional configuration information for the AI-based CSI report. According to an embodiment, the UE may transmit the CSI report at a CSI report timing changed based on the configuration information for the CSI report.

In step 615, 626, or 636, the UE may transmit an additional CSI report to the BS. According to an embodiment, the UE may identify an additional CSI report offset in addition to the existing CSI report offset, based on the configuration information on the CSI report received from the BS. The UE may transmit the additional CSI report to the BS, based on the additional CSI report offset. It is obvious that the additional CSI report may be performed instead of a general CSI report procedure under a condition based on the configuration information received from the BS, and may be performed as an additional process irrespective of whether the CSI report procedure based on the general CSI report procedure is performed.

In step 616, the BS may transmit a periodic CSI-RS to the UE.

According to the periodic CSI report process, the CSI report operation performed in steps 618, 614, and 615 may be performed similarly. According to various embodiments of the disclosure, it is obvious that the aforementioned steps may be performed repeatedly.

In step 619, 627, or 637, the UE may transmit information on a change in new computation inference time to the BS. Specifically, the UE may identify a change in an activated AI function, such as activation or deactivation of another AI function included in the UE, while performing a repetitive CSI transmission/reception process with the BS. Computation time of algorithms for the AI-based CSI generation may change by activating (or deactivating) another AI function in an AI chip included in the UE. Accordingly, the UE may identify the change in the new computation inference time, and may transmit information thereon to the BS. According to an embodiment, the UE may transmit to the BS the information on the change in the inference time and also information on a reconfiguration request (e.g., an RRC reconstruction message) caused thereby to request new configuration information. In case of the aperiodic CSI report (see 620) or the semi-persistent CSI report (see 630), after the step 628 or 638, the CSI report operation performed after the step 623 or 633 may be performed similarly. According to various embodiments of the disclosure, the aforementioned steps may be performed repeatedly. According to various embodiments of the disclosure, various steps of FIG. 6 may be performed again.

Although not shown in FIG. 6, according to various embodiments of the disclosure, the BS or the UE may deactivate another AI function during the aforementioned steps are performed or in at least one step before or after the steps are performed. Specifically, according to an embodiment, the UE may report information on a state of the AI chip to the BS. According to an embodiment, the UE may transmit information on the state of the AI chip to the BS periodically or when a trigger condition is satisfied. The trigger condition may be any reference value related to the state of the AI chip, detected by the UE. For example, the trigger condition configured to the UE by the BS may include one of a case where temperature of the AI chip exceeds a specific value, a case where the number of AI functions scheduled in the AI chip exceeds a specific reference, and a case where the computation time for generating the identified AI-based CSI exceeds a specific reference.

According to an embodiment, the BS may identify an AI function having a lowest priority among the AI functions included in the AI chip of the UE, based on information on the state of the AI chip, received from the UE. The BS may instruct the UE to deactivate the identified AI function having the lowest priority. Since the BS instructs to deactivate the AI function having the lowest priority, computation inference time for performing the AI-based CSI of the UE may be decreased.

According to an embodiment, the BS may instruct the UE to activate the deactivated AI function included in the AI chip of the UE, based on the information on the state of the AI chip, received from the UE.

An operation of reporting the aforementioned information on the state of the AI chip and specific descriptions thereof may be similar to the operation of reporting the information on the inference time change of the UE disclosed in the step 611, 621, or 631.

According to various embodiments of the disclosure, the BS and the UE may include at least one of all or some of the steps and some combinations thereof disclosed in the description related to FIG. 6 for the improved CSI report operation. For example, according to an embodiment, a CSI-RS transmission/reception operation and a CSI report operation may be included except for the report operation of the information on the change in the inference time of the UE, or only the CSI report operation may be included except for the CSI-RS transmission/reception operation or a UE capability information transmission/reception operation.

Figure 7:
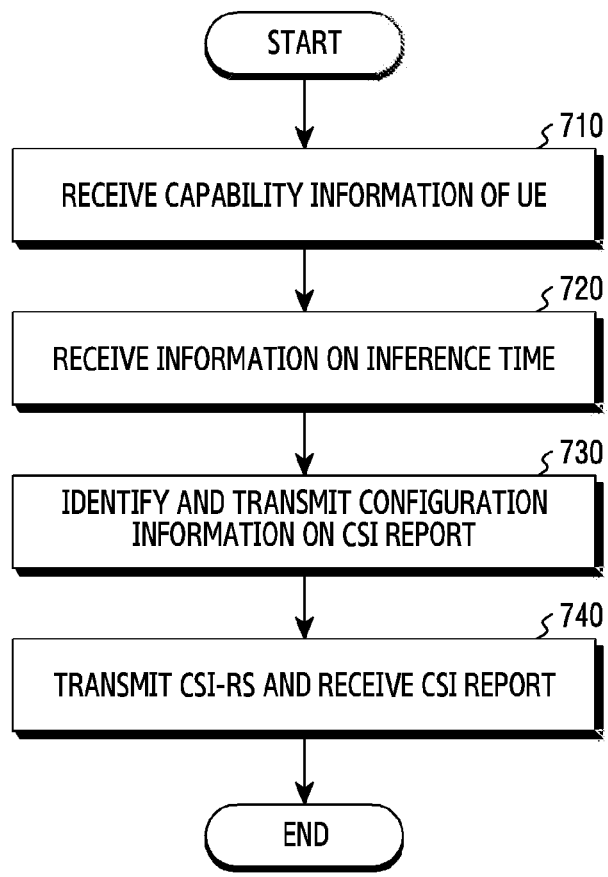
FIG. 7 illustrates a flowchart of an operation for configuring a CSI report of a base station in a wireless communication system according to embodiments of the present disclosure.

FIG. 7 illustrates a flow of an operation for configuring a CSI report of a BS in a wireless communication system according to embodiments of the present disclosure. According to various embodiments of the disclosure, referring to FIG. 7, it is obvious that an operation for a CSI report is also applicable to various CSI reports between a UE and the BS as long as it is clearly understood by ordinarily skilled in the art, in addition to a periodic, aperiodic, or semi-persistent CSI report procedure. In addition, according to various embodiments of the disclosure, at least one of all, some, or combinations of some of steps described below may be included, and it is obvious that some combinations of the steps for the periodic, aperiodic, or semi-persistent CSI report are possible within an implementable range. Hereinafter, operations for the CSI report are described by including all signal flows for the periodic, aperiodic, and semi-persistent CSI reports.

In step 710, the BS may receive capability information of the UE from the UE. According to an embodiment, the BS may receive from the UE the capability information including information on whether the UE supports the AI function.

The capability information received by the BS may include information on whether the UE is able to generate and report an AI-based CSI. The capability information received by the BS may be information reported periodically to the BS, or may be information reported to the BS, based on a trigger of the BS. According to an embodiment, the capability information received by the BS may be transmitted through higher layer signaling (e.g., radio resource control (RRC) signaling) or a medium access control (MAC) control element (CE).

According to an embodiment, the BS which has received the capability information from the UE may identify whether the UE supports the AI function including an AI-based CSI operation (CSI generation or reporting). When the UE does not support the AI function, the BS may transmit configuration information related to a non-AI-based CSI report to the UE. When the UE supports the AI function, the BS may further transmit configuration information related to the AI-based CSI report or configuration information on a report of a computation inference time change (hereinafter, interchangeably referred to as a report of an inference time change). According to an embodiment, the configuration information transmitted by the BS may be transmitted through at least one of the higher layer signaling (e.g., RRC signaling), the MAC CE, and DCI.

According to an embodiment, the BS may configure the UE to report the inference time change periodically in accordance with a determined timing, based on the configuration information related to the report of the inference time change. According to an embodiment, the BS may configure the UE to detect a state of an AI chip and report the inference time change when a trigger condition is satisfied, based on the configuration information related to the report of the inference time change. According to various embodiments of the disclosure, without being limited to the aforementioned configuration information, it is obvious that the UE is able to report the inference time change (e.g., when it is pre-configured in the UE) irrespective of the configuration information of the BS.

According to various embodiments of the disclosure, the aforementioned steps including transmitting the capability information of the UE or transmitting the configuration information on the report of the inference time change of the BS may be included entirely or in part or may be omitted.

In step 720, the BS may receive information on inference time from the UE. According to an embodiment, the BS may further receive, from the UE, information on a channel state in addition to the information on the change in the inference time. According to an embodiment, the change in the inference time of the disclosure may include a CSI report timing which varies, when an AI function including AI-based CSI compression has to be performed, in comparison with a timing at which CSI is reported based on general CSI configuration information. According to an embodiment, the change in the inference time may include a single value or may include a plurality of values (e.g., 2 ms to 5 ms) depending on an AI algorithm applied to the AI function (e.g., AI-based CSI compression, etc.). The information on the change in the inference time, received by the BS from the UE, may include a change in inference time for an AI-based CSI report or a change in inference time for various AI functions performed by an AI chip of the UE. The information on the change in the inference time, received by the BS, may include computation time required to generate the AI-based CSI.

According to an embodiment, the UE may measure the computation time for generating the CSI, based on a state of the AI chip performing the AI functions. As shown in FIG. 5, even in case of the same AI function (e.g., CSI compression, etc.), the computation time may be determined variously depending on an algorithm to be applied. The UE may identify the state of the AI chip to measure the computation time for compressing and generating the CSI. According to an embodiment, the UE may detect temperature of the AI chip or a change in the temperature. Alternatively, the UE may identify various AI functions being executed in the AI chip or scheduling of the algorithm to be applied to the various AI functions. The state of the AI chip, identified by the UE, may include physical property information (e.g., temperature or a change in the temperature, etc.) of the aforementioned AI chip or information on the algorithm of the AI functions. The UE may identify the state of the AI chip on a real-time basis, and may identify the computation time for generating the AI-based CSI, based on the identified state of the AI chip.

According to an embodiment, the UE may have information on pre-set inference time. The information on the inference time pre-set to the UE may include a combination of each of pre-measured AI functions and inference time information of the AI functions. Alternatively, the information on the pre-set inference time may include a mapping relationship of each of the pre-measured AI functions and the inference time information for each of the AI functions. According to an embodiment, the UE may identify the computation time for generating the AI-based CSI, based on the information on the pre-set inference time and the AI functions implemented in the AI chip.

According to an embodiment, the UE may identify the information on the inference time change, based on the computation time for generating the identified AI-based CSI. The UE may transmit the information on the identified inference time change to the BS. According to an embodiment, the UE may transmit the information on the inference time change to the BS, based on configuration information related to the inference time change report received from the BS. According to an embodiment, the UE may transmit the information on the inference time change to the BS, when a trigger condition is satisfied, based on the configuration information related to the inference time change report received from the BS. The trigger condition may be any reference value related to the state of the AI chip, detected by the UE. For example, the trigger condition configured to the UE by the BS may include one of a case where temperature of the AI chip exceeds a specific value, a case where the number of AI functions scheduled in the AI chip exceeds a specific reference, and a case where the computation time for generating the identified AI-based CSI exceeds a specific reference. According to an embodiment, the information on the change in the inference time, transmitted by the UE, may be transmitted through at least one of the higher layer signaling (e.g., RRC signaling), the MAC CE, and the DCI.

According to various embodiments of the disclosure, the aforementioned steps including receiving information on the inference time change by the BS or transmitting report configuration information of the inference time change of the BS may be included entirely or in part or may be omitted.

In step 730, the BS may identify the configuration information on the CSI report and transmit an identification result to the UE. The configuration information transmission of the BS is not limited to configuration information transmission through higher layer signaling (e.g., RRC signaling). According to an embodiment, the BS may obviously transmit the configuration information through the MAC or the DCI, and may transmit the information not only through a downlink control channel but also a data channel. According to an embodiment, the BS may further transmit, to the UE, additional configuration information identified based on the information on the inference time change, in addition to the configuration information related to the general CSI report.

According to an embodiment, in case of the aperiodic CSI report or the semi-persistent CSI report, the configuration information for the CSI report, transmitted by the BS to the UE, may include information instructing to receive a CSI-RS and report the CSI, based on a trigger signal (e.g., MAC CE or DCI) received by the UE from the BS. According to various embodiments of the disclosure, in the aperiodic CSI report or the semi-persistent CSI report, the configuration information for the CSI report transmitted by the BS to the UE may include an indicator (e.g., an indicator for an offset) such as n slots after a trigger signal in regard to a CSI-related transmission/reception operation timing of the UE.

According to an embodiment, the BS may compare information on the inference time change, received from the UE, or a change in a channel state with a threshold. The BS may identify a timing for the CSI report, based on a comparison result. According to an embodiment, a case where the change in the channel state is not significant may include a case where channel coherence time is long. According to an embodiment, the change in the channel state may be determined based on whether the channel is stable or mobility of the UE. According to an embodiment, the change in the channel state may be identified based on an uplink signal (e.g., a sounding reference signal (SRS)) transmitted by the UE to the BS. According to an embodiment, all threshold values described below are not limited to the same threshold value, and may include respective different values. In case of "exceeding" may include "being greater than or equal to."

According to an embodiment, when the change in the inference time for CSI generation (e.g., compression and generation) is less than the threshold value, the BS may perform a CSI report procedure without having to configure an additional CSI report timing. That is, the BS may transmit configuration information (e.g., configuration information for a non AI based CSI report) to the UE, without the configuration for the additional CSI report timing. For example, the BS may determine that the inference time for the AI-based CSI generation (e.g., compression and generation) does not have significant effect on the CSI report timing to be originally configured by the BS, and may not perform the configuration for the additional CSI report timing in addition to the configuration of a general CSI report timing.

According to an embodiment, when the change in the inference time for CSI generation (e.g., compression and generation) is greater than the threshold value but the change in the channel state is less than a specific value (e.g., when the channel coherent time is greater than the specific value), the BS may change a CSI report timing, based on the information on the inference time change. According to an embodiment, when the change in the inference time for CSI generation (e.g., compression and generation) is greater than the change in the channel state (e.g., the channel coherent time), the BS may identify an additional CSI report offset in addition to the existing CSI report offset, based on the information on the inference time change. According to an embodiment, in case of the periodic CSI report, the BS may change a CSI report timing, by increasing a period for CSI-RS transmission and CSI reporting. Alternatively, the BS may change the CSI report timing by deferring the offset for the CSI report.

According to an embodiment, in case of the aperiodic CSI report or the semi-persistent CSI report, the BS may change the CSI report timing by instructing to perform the CSI report in n slots after a trigger signal, based on the received information on the change in the inference time. According to an embodiment, the BS may identify a value having a greatest change in each AI algorithm as a value of the change in the inference time, based on the received information on the change in the inference time, and may identify the identified value of the change in the inference time as a changed CSI report timing in addition to the existing CSI report timing. Since there is a relatively low need to immediately perform the CSI report in an environment in which the channel state does not change rapidly, the BS may identify a timing obtained by adding a value of the inference time change to the existing CSI report timing and allocate the timing to the UE, instead of configuring an additional CSI report, thereby efficiently performing a process for resource allocation. According to an embodiment, the BS may transmit configuration information to the UE by including information, which instructs the UE to be able to perform the CSI report, into the identified changed CSI report timing.

According to an embodiment, when the change in the inference time for CSI generation (e.g., compression and generation) is greater than the threshold value and the change in the channel state is greater than a specific value (e.g., when the channel coherent time is less than the specific value), the BS may identify an additional CSI report offset in addition to the existing CSI report offset, based on the information on the inference time change. In a case where there is a great change in the channel state, it may be difficult to reallocate the CSI report when the CSI report timing is deferred or missed. Therefore, the BS may identify an offset for an additional CSI report. According to an embodiment, in regard to AI-based CSI generation (e.g., compression and generation), the UE may not be able to complete a CSI computation (e.g., compression and generation) at a timing for a first CSI report configured by the BS.

In this case, the UE may not be able to perform the CSI report at the allocated timing of the first CSI report. However, when an offset (e.g., a timing for a second CSI report) for an additional CSI report is configured, the UE may perform the CSI report at a timing for the second CSI report. For example, when the inference time change is 2 ms to 5 ms, the BS may identify an additional CSI report timing offset corresponding to 2 ms and 5 ms in addition to the CSI report timing. According to an embodiment, when the UE is able to perform the CSI report, based on the timing for the first CSI report, the BS may reallocate to the UE a resource to which the timing for the second CSI report is allocated. According to an embodiment, in order to indicate the timing of the second CSI report, the BS may transmit information related to the additional CSI report timing. For example, the information related to the additional CSI report timing, transmitted by the BS, may include an indicator indicating n slots after the first CSI report timing. In addition, the number of additional CSI reporting timings is not limited to one, and the information related to the CSI report timing, transmitted by the BS, may include a plurality of additional CSI report timings and indicators for them.

According to an embodiment, the BS may transmit information on the additional CSI report timing in advance to the UE (e.g., RRC signaling), before receiving the information on the inference time change from the UE. According to an embodiment, the BS may configure the information on the additional CSI report timing configured in advance to the UE before performing (e.g., generating and compressing) the AI-based CSI, or may configure the information through a reconfiguration process while performing the AI-based CSI. When information on the change in the inference time identified by the UE is reported to the BS, the UE for which the information on the additional CSI report timing is configured in advance may identify the additional CSI report timing, based on information on a change in the identified inference time and information configured from the BS.

For example, the information on the additional CSI report timing configured in advance for the UE by the BS may include an additional report timing indicator. When the indicator is set to 0, the UE may identify a lowest value (e.g., 2 ms) of the inference time change (e.g., 2 ms to 5 ms) as a first report timing and identify a highest value (e.g., 5 ms) as a second report timing, and may report CSI, based on the identified report timings. When the indicator is set to 1, the UE may identify an average value (e.g., 3.5 ms) of the inference time change (e.g., 2 ms to 5 ms) as the first report timing and identify the highest value (e.g., 5 ms) as the second report timing, and may report the CSI, based on the identified report timings. However, this is only an example, and obviously, the information on the CSI report timings to be configured in advance to the UE and the indicator included in the information may be implemented with a variety of parameters or content.

According to an embodiment, the BS may transmit configuration information including the information on the identified additional CSI report timing to the UE in addition to the CSI report offset. According to an embodiment, the BS may transmit a control indication related to the information on the identified additional CSI report timing to the UE.

According to an embodiment, when the change in the inference time for CSI generation (e.g., compression and generation) is greater than the threshold value and the change in the channel state is greater than a specific value (e.g., when the channel coherent time is less than the specific value), the BS may deactivate an AI-based CSI feedback (e.g., AI-based CSI compression and generation). According to an embodiment, the threshold value for the change in the inference time may include a threshold value to prepare for a change in inference time too great to identify a report timing for an AI-based CSI report.

When the change in the inference time includes a significantly great value, the BS may identify that it is not able to support an AI-based CSI compression operation of the UE, and thus may instruct the UE to deactivate the AI-based CSI function. According to an embodiment, after the AI-based CSI function is deactivated, the BS may receive information on the change in the inference time again from the UE and may compare this with a threshold value. The BS may identify whether to activate the AI-based CSI function, based on a comparison result between the change in the inference time or the change in the channel state and each threshold value. When a specific condition is satisfied, the BS may instruct the UE to activate the AI-based CSI function, and the steps of FIG. 7 may be performed again.

According to an embodiment, the BS may identify CSI report categories, based on the information on the change in the inference time, received from the UE. Obviously, the BS may identity the CSI report categories irrespective of the information on the change in the inference time. The CSI report categories identified by the BS may include information on UEs classified based on a specific criterion. The CSI report categories may include information on individual report timing. For example, a category A may include information for indicating to have an additional CSI report timing offset after n slots, or a category B may include information for indicating to change the CSI report timing after n slots.

However, this is only one example, and information (an operation for a CSI report) on a CSI report indicated by the BS and included in one category may be unified or may include specifically separate information. According to an embodiment, the BS may identify a CSI report category corresponding to the UE among the CSI report categories, based on capability information received from the UE, and may transmit information on the identified CSI report category to the UE. According to an embodiment, the BS may identify the CSI report category corresponding to the UE among the CSI report categories, based on the information on the change in the inference time, received from the UE, and may transmit information on the identified CSI report category to the UE.

According to various embodiments of the disclosure, the aforementioned steps including identifying the configuration information on the CSI report of the BS or transmitting report configuration information of the inference time change of the BS may be included entirely or in part or may be omitted.

In step 740, the BS may transmit the CSI-RS to the UE and receive the CSI report from the UE. According to an embodiment, the BS may transmit a reference signal related to CSI to the UE. The reference signal transmitted by the BS may be a CSI-RS, but is not limited to this embodiment. For example, it is obvious that an operation utilizing a synchronization signal block (SSB) instead of the CSI-RS illustrated and described with reference to FIG. 7 is also included in embodiments of the disclosure. According to an embodiment, the BS may periodically transmit the CSI-RS to the UE. In case of an aperiodic CSI report or a semi-persistent report, the BS may transmit a trigger signal for transmitting the CSI-RS in advance. According to an embodiment, the trigger signal transmitted by the BS may include a MAC CE or DCI. According to an embodiment, the trigger signal transmitted by the BS may be a signal used as a reference offset to indicate at least one of a transmission/reception timing of the CSI-RS, a report timing of the CSI, and an additional report timing of the CSI.

According to an embodiment, the BS may receive the CSI report from the UE. According to an embodiment, the CSI report received by the BS from the UE may be CSI compressed by AI-based CSI generation. According to an embodiment, the UE may perform the CSI report, based on configuration information for the CSI report received from the BS. According to an embodiment, the UE may perform the CSI report, based on the configuration information including at least one of operations for the CSI report identified by the BS. According to an embodiment, the UE may transmit the CSI report in accordance with a general CSI report procedure, without additional configuration information for the AI-based CSI report. According to an embodiment, the UE may transmit the CSI report at a CSI report timing changed based on the configuration information for the CSI report. According to an embodiment, the BS may receive an additional CSI report from the UE. According to an embodiment, the UE may identify an additional CSI report offset in addition to the existing CSI report offset, based on the configuration information on the CSI report received from the BS. The UE may transmit the additional CSI report to the BS, based on the additional CSI report offset.

According to an embodiment, although not shown in FIG. 7, the BS may receive information on a change in new computation inference time from the UE. Specifically, the UE may identify a change in an activated AI function, such as activation or deactivation of another AI function included in the UE, while performing a repetitive CSI transmission/reception process with the BS. Computation time of algorithms for the AI-based CSI generation may change by activating (or deactivating) another AI function in an AI chip included in the UE. Accordingly, the UE may identify the change in the new computation inference time, and may transmit information thereon to the BS. According to an embodiment, the UE may transmit to the BS the information on the change in the inference time and also information on a reconfiguration request (e.g., an RRC reconstruction message) caused thereby to request new configuration information.

According to various embodiments of the disclosure, although not shown in FIG. 7, the BS or the UE may deactivate another AI function during the aforementioned steps are performed or in at least one step before or after the steps are performed. Specifically, according to an embodiment, the UE may report information on a state of the AI chip to the BS. According to an embodiment, the UE may transmit information on the state of the AI chip to the BS periodically or when a trigger condition is satisfied. The trigger condition may be any reference value related to the state of the AI chip, detected by the UE. For example, the trigger condition configured to the UE by the BS may include one of a case where temperature of the AI chip exceeds a specific value, a case where the number of AI functions scheduled in the AI chip exceeds a specific reference, and a case where the computation time for generating the identified AI-based CSI exceeds a specific reference.

According to an embodiment, the BS may identify an AI function having a lowest priority among the AI functions included in the AI chip of the UE, based on information on the state of the AI chip, received from the UE. The BS may instruct the UE to deactivate the identified AI function having the lowest priority. Since the BS instructs to deactivate the AI function having the lowest priority, computation inference time for performing the AI-based CSI of the UE may be decreased. According to an embodiment, the BS may instruct the UE to activate the deactivated AI function included in the AI chip of the UE, based on the information on the state of the AI chip, received from the UE. An operation of reporting the aforementioned information on the state of the AI chip and specific descriptions thereof may be similar to the operation of reporting the information on the inference time change of the UE disclosed in FIG. 7.

According to various embodiments of the disclosure, it is obvious that the aforementioned steps may be performed repeatedly. According to various embodiments of the disclosure, some of various steps of FIG. 7 may be omitted or performed again. According to various embodiments of the disclosure, the aforementioned steps including receiving the information on the inference time change of the BS or transmitting the report configuration information of the inference time change of the BS may be included entirely or in part or may be omitted.

Figure 8:
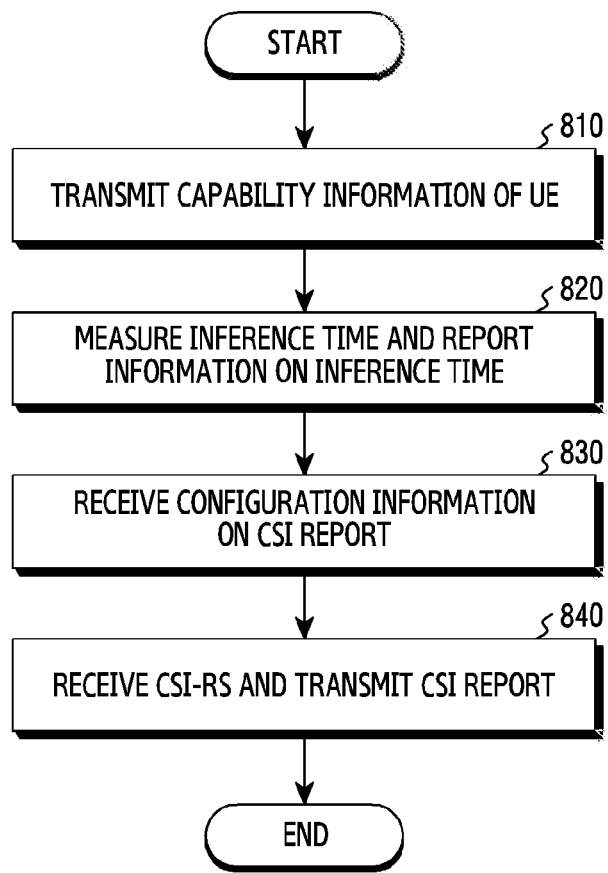
FIG. 8 illustrates a flowchart of an operation for configuring a CSI report of a terminal in a wireless communication system according to embodiments of the present disclosure.

FIG. 8 illustrates a flow of an operation for configuring a CSI report of a UE in a wireless communication system according to embodiments of the present disclosure. According to various embodiments of the disclosure, referring to FIG. 8, it is obvious that an operation for a CSI report is also applicable to various CSI reports between the UE and a BS as long as it is clearly understood by ordinarily skilled in the art, in addition to a periodic, aperiodic, or semi-persistent CSI report procedure. In addition, according to various embodiments of the disclosure, at least one of all, some, or combinations of some of steps described below may be included, and it is obvious that some combinations of the steps for the periodic, aperiodic, or semi-persistent CSI report are possible within an implementable range. Hereinafter, operations for the CSI report are described by including all signal flows for the periodic, aperiodic, and semi-persistent CSI reports.

In step 810, the UE may transmit capability information of the UE to the BS. According to an embodiment, the UE may transmit to the BS the UE the capability information including information on whether the UE supports the AI function. The capability information transmitted by the UE may include information on whether the UE is able to generate and report an AI-based CSI. The capability information transmitted by the UE may be information reported periodically to the BS, or may be information reported to the BS, based on a trigger of the BS. According to an embodiment, the capability information transmitted by the UE may be transmitted through higher layer signaling (e.g., RRC signaling) or a MAC CE.

According to an embodiment, the BS which has received the capability information from the UE may identify whether the UE supports the AI function including an AI-based CSI operation (CSI generation or reporting). When the UE does not support the AI function, the BS may transmit configuration information related to a non-AI-based CSI report to the UE. When the UE supports the AI function, the BS may further transmit configuration information related to the AI-based CSI report or configuration information on a report of a computation inference time change (hereinafter, interchangeably referred to as a report of an inference time change). According to an embodiment, the configuration information transmitted by the BS may be transmitted through at least one of the higher layer signaling (e.g., RRC signaling), the MAC CE, and DCI.

According to an embodiment, the BS may configure the UE to report the inference time change periodically in accordance with a determined timing, based on the configuration information related to the report of the inference time change. According to an embodiment, the BS may configure the UE to detect a state of an AI chip and report the inference time change when a trigger condition is satisfied, based on the configuration information related to the report of the inference time change. According to various embodiments of the disclosure, without being limited to the aforementioned configuration information, it is obvious that the UE is able to report the inference time change (e.g., when it is pre-configured in the UE) irrespective of the configuration information of the BS.

According to various embodiments of the disclosure, the aforementioned steps including transmitting the capability information of the UE or transmitting the configuration information on the report of the inference time change of the BS may be included entirely or in part or may be omitted.

In step 820, the UE may measure inference time, and may transmit information on the inference time to the BS. According to an embodiment, the UE may further transmit, to the BS, information on a channel state in addition to the information on the change in the inference time. According to an embodiment, the change in the inference time of the disclosure may include a CSI report timing which varies, when an AI function including AI-based CSI compression has to be performed, in comparison with a timing at which CSI is reported based on general CSI configuration information. According to an embodiment, the change in the inference time may include a single value or may include a plurality of values (e.g., Nms to Mms, where N and M are positive integers, N<M)) depending on an AI algorithm applied to the AI function (e.g., AI-based CSI compression, etc.).

When the change in the inference time includes the single value, the single value may be one value representing a plurality of values depending on the AI algorithm, and may be, for example, at least one of a sum of the plurality of values, a weighted sum, an average value, and a highest value. The information on the change in the inference time, transmitted by the UE to the BS, may include a change in inference time for an AI-based CSI report or a change in inference time for various AI functions performed in the AI chip of the UE. The information on the change in the inference time, transmitted by the UE, may include computation time required to generate the AI-based CSI. In addition, the information on the change in the inference time, transmitted by the UE, may include a difference value (or an offset) with respect to the computation time for generating the AI-based CSI (or a time for generating a non-AI-based CSI) required previous to the report, or may include an absolute value of the computation time for generating the AI-based CSI. Alternatively, the information on the change in the inference time, transmitted by the UE, may include information on a quantized value which divides a difference value for each section, with respect to the computation time for generating the AI-based CSI (or a time for generating a non-AI-based CSI) required previous to the report.

According to an embodiment, the UE may measure the computation time for generating the CSI, based on a state of the AI chip performing the AI functions. As shown in FIG. 5, even in case of the same AI function (e.g., CSI compression, etc.), the computation time may be determined variously depending on an algorithm to be applied. The UE may identify the state of the AI chip to measure the computation time for compressing and generating the CSI. According to an embodiment, the UE may detect temperature of the AI chip or a change in the temperature. Alternatively, the UE may identify various AI functions being executed in the AI chip or scheduling of the algorithm to be applied to the various AI functions. The state of the AI chip, identified by the UE, may include physical property information (e.g., temperature or a change in the temperature, etc.) of the aforementioned AI chip or information on the algorithm of the AI functions. The UE may identify the state of the AI chip on a real-time basis, and may identify the computation time for generating the AI-based CSI, based on the identified state of the AI chip.

According to an embodiment, the UE may have information on pre-set inference time. The information on the inference time pre-set to the UE may include a combination of each of pre-measured AI functions and inference time information of the AI functions. Alternatively, the information on the pre-set inference time may include a mapping relationship of each of the pre-measured AI functions and the inference time information for each of the AI functions. According to an embodiment, the UE may identify the computation time for generating the AI-based CSI, based on the information on the pre-set inference time and the AI functions implemented in the AI chip.

According to an embodiment, the UE may identify the information on the inference time change, based on the computation time for generating the identified AI-based CSI. The UE may transmit the information on the identified inference time change to the BS. According to an embodiment, the UE may transmit the information on the inference time change to the BS, based on configuration information related to the inference time change report received from the BS. According to an embodiment, the UE may transmit the information on the inference time change to the BS, when a trigger condition is satisfied, based on the configuration information related to the inference time change report received from the BS. The trigger condition may be any reference value related to the state of the AI chip, detected by the UE.

For example, the trigger condition configured to the UE by the BS may include one of a case where temperature of the AI chip exceeds a specific value, a case where the number of AI functions scheduled in the AI chip exceeds a specific reference, and a case where the computation time for generating the identified AI-based CSI exceeds a specific reference. According to an embodiment, the information on the change in the inference time, transmitted by the UE, may be transmitted through at least one of the higher layer signaling (e.g., RRC signaling), the MAC CE, and the DCI.

According to various embodiments of the disclosure, the aforementioned steps including measuring the change in the inference time of the UE or receiving information on the inference time change of the BS may be included entirely or in part or may be omitted.

In step 830, the UE may receive configuration information on the CSI report from the BS. The configuration information reception of the UE is not limited to configuration information transmission through higher layer signaling (e.g., RRC signaling). According to an embodiment, the UE may obviously receive the configuration information through the MAC or the DCI, and may receive the information not only through a downlink control channel but also a data channel. According to an embodiment, the UE may further receive, from the BS, additional configuration information identified based on the information on the inference time change, in addition to the configuration information related to the general CSI report.

According to an embodiment, in case of the aperiodic CSI report or the semi-persistent CSI report, the configuration information for the CSI report, received by the UE from the BS, may include information instructing to receive a CSI-RS and report the CSI, based on a trigger signal (e.g., MAC CE or DCI) received by the UE from the BS. According to various embodiments of the disclosure, in the aperiodic CSI report or the semi-persistent CSI report, the configuration information for the CSI report received by the UE from BS may include an indicator such as n slots after a trigger signal in regard to a CSI-related transmission/reception operation timing of the UE.

According to an embodiment, the BS may compare information on the inference time change, received from the UE, or a change in a channel state with a threshold. The BS may identify a timing for the CSI report, based on a comparison result. According to an embodiment, a case where the change in the channel state is not significant may include a case where channel coherence time is long. According to an embodiment, the change in the channel state may be determined based on whether the channel is stable or mobility of the UE. According to an embodiment, the change in the channel state may be identified based on an uplink signal (e.g., a sounding reference signal (SRS)) transmitted by the UE to the BS. According to an embodiment, all threshold values described below are not limited to the same threshold value, and may include respective different values. In case of "exceeding" may include "being greater than or equal to."

According to an embodiment, when the change in the inference time for CSI generation (e.g., compression and generation) is less than the threshold value, the BS may perform a CSI report procedure without having to configure an additional CSI report timing. That is, the BS may transmit configuration information (e.g., configuration information for a non AI based CSI report) to the UE, without the configuration for the additional CSI report timing. For example, the BS may determine that the inference time for the AI-based CSI generation (e.g., compression and generation) does not have significant effect on the CSI report timing to be originally configured by the BS, and may not perform the configuration for the additional CSI report timing in addition to the configuration of a general CSI report timing.

According to an embodiment, when the change in the inference time for CSI generation (e.g., compression and generation) is greater than the threshold value but the change in the channel state is less than a specific value (e.g., when the channel coherent time is greater than the specific value), the BS may change a CSI report timing, based on the information on the inference time change. According to an embodiment, when the change in the inference time for CSI generation (e.g., compression and generation) is greater than the change in the channel state (e.g., the channel coherent time), the BS may identify an additional CSI report offset in addition to the existing CSI report offset, based on the information on the inference time change. According to an embodiment, in case of the periodic CSI report, the BS may change a CSI report timing, by increasing a period for CSI-RS transmission and CSI reporting. Alternatively, the BS may change the CSI report timing by deferring the offset for the CSI report.

According to an embodiment, in case of the aperiodic CSI report or the semi-persistent CSI report, the BS may change the CSI report timing by instructing to perform the CSI report in n slots after a trigger signal, based on the received information on the change in the inference time. According to an embodiment, the BS may identify a value having a greatest change in each AI algorithm as a value of the change in the inference time, based on the received information on the change in the inference time, and may identify the identified value of the change in the inference time as a changed CSI report timing in addition to the existing CSI report timing. Since there is a relatively low need to immediately perform the CSI report in an environment in which the channel state does not change rapidly, the BS may identify a timing obtained by adding a value of the inference time change to the existing CSI report timing and allocate the timing to the UE, instead of configuring an additional CSI report, thereby efficiently performing a process for resource allocation. According to an embodiment, the BS may transmit configuration information to the UE by including information, which instructs the UE to be able to perform the CSI report, into the identified changed CSI report timing.

According to an embodiment, when the change in the inference time for CSI generation (e.g., compression and generation) is greater than the threshold value and the change in the channel state is greater than a specific value (e.g., when the channel coherent time is less than the specific value), the BS may identify an additional CSI report offset in addition to the existing CSI report offset, based on the information on the inference time change. In a case where there is a great change in the channel state, it may be difficult to reallocate the CSI report when the CSI report timing is deferred or missed. Therefore, the BS may identify an offset for an additional CSI report. According to an embodiment, in regard to AI-based CSI generation (e.g., compression and generation), the UE may not be able to complete a CSI computation (e.g., compression and generation) at a timing for a first CSI report configured by the BS.

In this case, the UE may not be able to perform the CSI report at the allocated timing of the first CSI report. However, when an offset (e.g., a timing for a second CSI report) for an additional CSI report is configured, the UE may perform the CSI report at a timing for the second CSI report. For example, when the inference time change is 2 ms to 5 ms, the BS may identify an additional CSI report timing offset corresponding to 2 ms and 5 ms in addition to the CSI report timing. According to an embodiment, when the UE is able to perform the CSI report, based on the timing for the first CSI report, the BS may reallocate to the UE a resource to which the timing for the second CSI report is allocated. According to an embodiment, in order to indicate the timing of the second CSI report, the BS may transmit information related to the additional CSI report timing. For example, the information related to the additional CSI report timing, transmitted by the BS, may include an indicator indicating n slots after the first CSI report timing. In addition, the number of additional CSI reporting timings is not limited to one, and the information related to the CSI report timing, transmitted by the BS, may include a plurality of additional CSI report timings and indicators for them.

According to an embodiment, the BS may transmit information on the additional CSI report timing in advance to the UE (e.g., RRC signaling), before receiving the information on the inference time change from the UE. According to an embodiment, the BS may configure the information on the additional CSI report timing configured in advance to the UE before performing (e.g., generating and compressing) the AI-based CSI, or may configure the information through a reconfiguration process while performing the AI-based CSI. When information on the change in the inference time identified by the UE is reported to the BS, the UE for which the information on the additional CSI report timing is configured in advance may identify the additional CSI report timing, based on information on a change in the identified inference time and information configured from the BS.

For example, the information on the additional CSI report timing configured in advance for the UE by the BS may include an additional report timing indicator. When the indicator is set to 0, the UE may identify a lowest value (e.g., 2 ms) of the inference time change (e.g., 2 ms to 5 ms) as a first report timing and identify a highest value (e.g., 5 ms) as a second report timing, and may report CSI, based on the identified report timings. When the indicator is set to 1, the UE may identify an average value (e.g., 3.5 ms) of the inference time change (e.g., 2 ms to 5 ms) as the first report timing and identify the highest value (e.g., 5 ms) as the second report timing, and may report the CSI, based on the identified report timings. However, this is only an example, and obviously, the information on the CSI report timings to be configured in advance to the UE and the indicator included in the information may be implemented with a variety of parameters or content.

According to an embodiment, the BS may transmit configuration information including the information on the identified additional CSI report timing to the UE in addition to the CSI report offset. According to an embodiment, the BS may transmit a control indication related to the information on the identified additional CSI report timing to the UE.

According to an embodiment, when the change in the inference time for CSI generation (e.g., compression and generation) is greater than the threshold value and the change in the channel state is greater than a specific value (e.g., when the channel coherent time is less than the specific value), the BS may deactivate an AI-based CSI feedback (e.g., AI-based CSI compression and generation). According to an embodiment, the threshold value for the change in the inference time may include a threshold value to prepare for a change in inference time too great to identify a report timing for an AI-based CSI report. When the change in the inference time includes a significantly great value, the BS may identify that it is not able to support an AI-based CSI compression operation of the UE, and thus may instruct the UE to deactivate the AI-based CSI function. According to an embodiment, after the AI-based CSI function is deactivated, the BS may receive information on the change in the inference time again from the UE and may compare this with a threshold value. The BS may identify whether to activate the AI-based CSI function, based on a comparison result between the change in the inference time or the change in the channel state and each threshold value. When a specific condition is satisfied, the BS may instruct the UE to activate the AI-based CSI function, and the steps of FIG. 6 may be performed again.

According to an embodiment, the BS may identify CSI report categories, based on the information on the change in the inference time, received from the UE. Obviously, the BS may identity the CSI report categories irrespective of the information on the change in the inference time. The CSI report categories identified by the BS may include information on UEs classified based on a specific criterion. The CSI report categories may include information on individual report timing. For example, a category A may include information for indicating to have an additional CSI report timing offset after n slots, or a category B may include information for indicating to change the CSI report timing after n slots.

However, this is only one example, and information (an operation for a CSI report) on a CSI report indicated by the BS and included in one category may be unified or may include specifically separate information. According to an embodiment, the BS may identify a CSI report category corresponding to the UE among the CSI report categories, based on capability information received from the UE, and may transmit information on the identified CSI report category to the UE. According to an embodiment, the BS may identify the CSI report category corresponding to the UE among the CSI report categories, based on the information on the change in the inference time, received from the UE, and may transmit information on the identified CSI report category to the UE.

According to various embodiments of the disclosure, the aforementioned steps including identifying by the BS the configuration information on the CSI report or receiving the configuration information on the inference time change of the UE may be included entirely or in part or may be omitted.

In step 840, the UE may receive the CSI-RS from the BS and may transmit the CSI report to the BS. According to an embodiment, the BS may receive a reference signal related to CSI from the BS. The reference signal received by the UE may be a CSI-RS. According to an embodiment, the UE may periodically receive the CSI-RS from the BS. In case of an aperiodic CSI report or a semi-persistent report, the UE may receive a trigger signal for transmitting the CSI-RS in advance. According to an embodiment, the trigger signal received by the UE may include a MAC CE or DCI. According to an embodiment, the trigger signal received by the UE may be a signal used as a reference offset to indicate at least one of a transmission/reception timing of the CSI-RS, a report timing of the CSI, and an additional report timing of the CSI.

According to an embodiment, the UE may transmit the CSI report to the BS. According to an embodiment, the CSI report transmitted by the UE to the BS may be CSI compressed by AI-based CSI generation. According to an embodiment, the UE may perform the CSI report, based on configuration information for the CSI report received from the BS. According to an embodiment, the UE may perform the CSI report, based on the configuration information including at least one of operations for the CSI report identified by the BS. According to an embodiment, the UE may transmit the CSI report in accordance with a general CSI report procedure, without additional configuration information for the AI-based CSI report. According to an embodiment, the UE may transmit the CSI report at a CSI report timing changed based on the configuration information for the CSI report. According to an embodiment, the UE may transmit an additional CSI report to the BS.

According to an embodiment, the UE may identify an additional CSI report offset in addition to the existing CSI report offset, based on the configuration information on the CSI report received from the BS. The UE may transmit the additional CSI report to the BS, based on the additional CSI report offset. It is obvious that the additional CSI report may be performed instead of a general CSI report procedure under a condition based on the configuration information received from the BS, and may be performed as an additional process irrespective of whether the CSI report procedure based on the general CSI report procedure is performed.

According to an embodiment, although not shown in FIG. 8, the BS may receive information on a change in new computation inference time from the UE. Specifically, the UE may identify a change in an activated AI function, such as activation or deactivation of another AI function included in the UE, while performing a repetitive CSI transmission/reception process with the BS. Computation time of algorithms for the AI-based CSI generation may change by activating (or deactivating) another AI function in an AI chip included in the UE. Accordingly, the UE may identify the change in the new computation inference time, and may transmit information thereon to the BS. According to an embodiment, the UE may transmit to the BS the information on the change in the inference time and also information on a reconfiguration request (e.g., an RRC reconstruction message) caused thereby to request new configuration information.

According to various embodiments of the disclosure, although not shown in FIG. 8, the BS or the UE may deactivate another AI function during the aforementioned steps are performed or in at least one step before or after the steps are performed. Specifically, according to an embodiment, the UE may report information on a state of the AI chip to the BS. According to an embodiment, the UE may transmit information on the state of the AI chip to the BS periodically or when a trigger condition is satisfied. The trigger condition may be any reference value related to the state of the AI chip, detected by the UE. For example, the trigger condition configured to the UE by the BS may include one of a case where temperature of the AI chip exceeds a specific value, a case where the number of AI functions scheduled in the AI chip exceeds a specific reference, and a case where the computation time for generating the identified AI-based CSI exceeds a specific reference.

According to an embodiment, the BS may identify an AI function having a lowest priority among the AI functions included in the AI chip of the UE, based on information on the state of the AI chip, received from the UE. The BS may instruct the UE to deactivate the identified AI function having the lowest priority. Since the BS instructs to deactivate the AI function having the lowest priority, computation inference time for performing the AI-based CSI of the UE may be decreased. According to an embodiment, the BS may instruct the UE to activate the deactivated AI function included in the AI chip of the UE, based on the information on the state of the AI chip, received from the UE. An operation of reporting the aforementioned information on the state of the AI chip and specific descriptions thereof may be similar to the operation of reporting the information on the inference time change of the UE disclosed in FIG. 8.

According to various embodiments of the disclosure, it is obvious that the aforementioned steps may be performed repeatedly. According to various embodiments of the disclosure, some of various steps of FIG. 8 may be omitted or performed again. According to various embodiments of the disclosure, the aforementioned steps including receiving the information on the inference time change of the BS or transmitting the report configuration information of the inference time change of the BS may be included entirely or in part or may be omitted.

According to various embodiments of the disclosure, a method performed by a base station in a wireless communication system may include receiving, from a terminal, capability information indicating whether the terminal supports generation of artificial intelligence (AI)-based channel state information (CSI), receiving, from the terminal, information on a change in inference time related to the AI-based CSI generation and information on a change in a channel state, based on the capability information, identifying information on a CSI report timing, based on the information on the change in the inference time and the change in the channel state, transmitting, to the terminal, radio resource control (RRC) configuration information including the identified CSI report timing, transmitting a CSI-reference signal (RS) to the terminal, and receiving the CSI report from the terminal, based on the CSI-RS and the information on the CSI report timing.

According to an embodiment, the identifying of the information on the CSI report timing may include identifying an offset for the CSI report to a value greater than the change in the inference time when the change in the inference time exceeds a first threshold and the change in the channel state is less than a second threshold, or identifying a plurality of offsets for the CSI report when the change in the inference time exceeds the first threshold and the change in the channel state is greater than the second threshold.

According to an embodiment, the method may further include identifying whether to deactivate the AI-based CSI generation of the terminal when the change in the inference time exceeds a third threshold and the change in the channel state is greater than a fourth threshold, and transmitting, to the terminal, information instructing to deactivate the AI-based CSI generation of the terminal, based on the identification result.

According to an embodiment, the method may further include identifying whether to deactivate at least one of different AI functions included in the terminal, based on the change in the inference time, and transmitting, to the terminal, information instructing to deactivate at least one of the different functions included in the terminal, based on the identification result.

According to an embodiment, the method may further include transmitting, to the terminal, a trigger signal related to an aperiodic CSI report. The trigger signal may be one of a medium access control (MAC) control element (CE) and downlink control information (DCI).

According to various embodiments of the disclosure, a method performed by a terminal in a wireless communication system may include transmitting, to a base station, capability information indicating whether the terminal supports generation of AI-based CSI, identifying state information of an AI chip which performs the AI-based CSI generation, identifying a change in inference time related to the AI-based CSI generation, based on the identified state information of the AI chip, transmitting, to the base station, information on the identified change in the inference time related to the CSI generation and information on the change in the channel state, receiving, from the base station, RRC configuration information including a CSI report timing, based on the information on the change in the inference time and the change in the channel state, receiving a CSI-RS from the base station, and transmitting the CSI report to the base station, based on the CSI-RS and the information on the CSI report timing.

According to an embodiment, the information on the CSI report timing, received from the base station may include an offset for the CSI report having a value greater than the change in the inference change when the change in the inference time exceeds a first threshold and the change in the channel state is less than a second threshold, or a plurality of offsets for the CSI report when the change in the inference time exceeds the first threshold and the change in the channel state is greater than the second threshold.

According to an embodiment, the method may further include receiving, from the base station, information instructing to deactivate the AI-based CSI generation of the terminal, based on the change in the inference time and the change in the channel state.

According to an embodiment, the method may further include receiving, from the base station, information indicating to deactivate at least one of different AI functions included in the terminal, based on the change in the inference time.

According to an embodiment, the method may further include receiving, from the base station, a trigger signal related to an aperiodic CSI report. The trigger signal may be one of a MAC CE and DCI.

According to various embodiments of the disclosure, a base station in a wireless communication system may include at least one transceiver, and at least one processor operatively coupled to the at least one transceiver. The at least one processor may be configured to receive, from the terminal, capability information indicating whether the terminal supports generation of AI-based CSI, receive, from the terminal, information on a change in inference time related to the AI-based CSI generation and information on a change in a channel state, based on the capability information, identify information on a CSI report timing, based on the information on the change in the inference time and the change in the channel state, transmit, to the terminal, RRC configuration information including the identified CSI report timing, transmit a CSI-RS to the terminal, and receive the CSI report from the terminal, based on the CSI-RS and the information on the CSI report timing.

According to an embodiment, in order to identify the information on the CSI report timing, the at least one processor may be configured to identify an offset for the CSI report to a value greater than the change in the inference time when the change in the inference time exceeds a first threshold and the change in the channel state is less than a second threshold, or identify a plurality of offsets for the CSI report when the change in the inference time exceeds the first threshold and the change in the channel state is greater than the second threshold.

According to an embodiment, the at least one processor may be configured to identify whether to deactivate the AI-based CSI generation of the terminal when the change in the inference time exceeds a third threshold and the change in the channel state is greater than a fourth threshold, and transmit, to the terminal, information instructing to deactivate the AI-based CSI generation of the terminal, based on the identification result.

According to an embodiment, the at least one processor may be configured to identify whether to deactivate at least one of different AI functions included in the terminal, based on the change in the inference time, and transmit, to the terminal, information instructing to deactivate at least one of the different functions included in the terminal, based on the identification result.

According to an embodiment, the at least one processor may be configured to transmit, to the terminal, a trigger signal related to an aperiodic CSI report. The trigger signal may be one of a MAC CE and DCI.

According to various embodiments of the disclosure, a terminal in a wireless communication system may include at least one transceiver, and at least one processor operatively coupled to the at least one transceiver. The at least one processor may be configured to transmit, to a base station, capability information indicating whether the terminal supports generation of AI-based CSI, identify state information of an AI chip which performs the AI-based CSI generation, identify a change in inference time related to the AI-based CSI generation, based on the identified state information of the AI chip, transmit, to the base station, information on the identified change in the inference time related to the CSI generation and information on the change in the channel state, receive, from the base station, RRC configuration information including a CSI report timing, based on the information on the change in the inference time and the change in the channel state, receive a CSI-RS from the base station, and transmit the CSI report to the base station, based on the CSI-RS and the information on the CSI report timing.

According to an embodiment, the information on the CSI report timing, received from the base station, may include an offset for the CSI report having a value greater than the change in the inference change when the change in the inference time exceeds a first threshold and the change in the channel state is less than a second threshold, or a plurality of offsets for the CSI report when the change in the inference time exceeds the first threshold and the change in the channel state is greater than the second threshold.

According to an embodiment, the at least one processor may be configured to receive, from the base station, information instructing to deactivate the AI-based CSI generation of the terminal, based on the change in the inference time and the change in the channel state.

According to an embodiment, the at least one processor may be configured to receive, from the base station, information indicating to deactivate at least one of different AI functions included in the terminal, based on the change in the inference time.

According to an embodiment, the at least one processor may be further configured to receive, from the base station, a trigger signal related to an aperiodic CSI report. The trigger signal may be one of a MAC CE and DCI.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment provided herein. However, the singular or plural expression is selected properly for a situation provided for the convenience of explanation, and thus the disclosure is not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

Although the present disclosure has been described with various embodiments, various changes and modifications may be suggested to one skilled in the art. It is intended that the present disclosure encompass such changes and modifications as fall within the scope of the appended claims.

What is claimed is:
1. A method performed by a base station in a wireless communication system, the method comprising:
  receiving, from a user equipment (UE), capability information indicating whether the UE is capable of generating artificial intelligence (AI)-based channel state information (CSI);

receiving, from the UE, information on a change in an inference time related to the AI-based CSI generation and information on a change in a channel state based on the capability information;

identifying information on a CSI report timing based on the information on the change in the inference time and the change in the channel state;

transmitting, to the UE, radio resource control (RRC) configuration information including the identified CSI report timing;

transmitting a CSI-reference signal (RS) to the UE; and receiving, from the UE, the CSI report based on the CSI-RS and the information on the CSI report timing.

2. The method of claim 1, wherein identifying the information on the CSI report timing comprises:

identifying an offset for the CSI report to a value greater than the change in the inference time when the change in the inference time exceeds a first threshold and the change in the channel state is less than a second threshold; or identifying a plurality of offsets for the CSI report when the change in the inference time exceeds the first threshold and the change in the channel state is greater than the second threshold.

3. The method of claim 1, further comprising:

determining whether to deactivate the AI-based CSI generation of the UE when the change in the inference time exceeds a third threshold and the change in the channel state is greater than a fourth threshold; and transmitting, to the UE, information instructing to deactivate the AI-based CSI generation of the UE based on the identification result.

4. The method of claim 1, further comprising:

determining whether to deactivate at least one of different AI functions included in the UE based on the change in the inference time; and transmitting, to the UE, information instructing to deactivate at least one of the different functions included in the UE based on the identification result.

5. The method of claim 1, further comprising transmitting, to the UE, a trigger signal related to an aperiodic CSI report, wherein the trigger signal is one of a medium access control (MAC) control element (CE) or downlink control information (DCI).

6. A method performed by a user equipment, (UE) in a wireless communication system, the method comprising:

transmitting, to a base station, capability information indicating whether the UE is capable of generating artificial intelligence (AI)-based channel state information (CSI);

identifying state information of an AI chip that performs the AI-based CSI generation;

identifying a change in an inference time related to the AI-based CSI generation based on the identified state information of the AI chip;

transmitting, to the base station, information on the identified change in the inference time related to the AI-based CSI generation and information on the change in the channel state;

receiving, from the base station, radio resource control (RRC) configuration information including a CSI report timing based on the information on the change in the inference time and the change in the channel state;

receiving a CSI-reference signal (RS) from the base station; and transmitting, to the base station, the CSI report to the base station based on the CSI-RS and the information on the CSI report timing.

7. The method of claim 6, wherein the information on the CSI report timing, received from the base station, comprises:

an offset for the CSI report including a value greater than the change in the inference change when the change in the inference time exceeds a first threshold and the change in the channel state is less than a second threshold; or a plurality of offsets for the CSI report when the change in the inference time exceeds the first threshold and the change in the channel state is greater than the second threshold.

8. The method of claim 6, further comprising receiving, from the base station, information instructing to deactivate the AI-based CSI generation of the UE based on the change in the inference time and the change in the channel state.

9. The method of claim 6, further comprising receiving, from the base station, information indicating to deactivate at least one of different AI functions included in the UE based on the change in the inference time.

10. The method of claim 6, further comprising receiving, from the base station, a trigger signal related to an aperiodic CSI report, wherein the trigger signal is one of a medium access control control element (MAC CE) and downlink control information (DCI).

11. A base station in a wireless communication system, the base station comprising:

a transceiver; and a controller coupled with the transceiver, wherein the controller is configured to:

receive, from a user equipment, (UE), capability information indicating whether the UE is capable of generating artificial intelligence (AI)-based channel state information (CSI);

receive, from the UE, information on a change in an inference time related to the AI-based CSI generation and information on a change in a channel state based on the capability information;

identify information on a CSI report timing, based on the information on the change in the inference time and the change in the channel state;

transmit, to the UE, radio resource control (RRC) configuration information including the identified CSI report timing;

transmit a CSI-reference signal (RS) to the UE; and receive, from the UE, the CSI report based on the CSI-RS and the information on the CSI report timing.

12. The base station of claim 11, wherein the controller is further configured to:

identify an offset for the CSI report to a value greater than the change in the inference time when the change in the inference time exceeds a first threshold and the change in the channel state is less than a second threshold; or identify a plurality of offsets for the CSI report when the change in the inference time exceeds the first threshold and the change in the channel state is greater than the second threshold.

13. The base station of claim 11, wherein the controller is further configured to:

determine whether to deactivate the AI-based CSI generation of the UE when the change in the inference time exceeds a third threshold and the change in the channel state is greater than a fourth threshold; and transmit, to the UE, information instructing to deactivate the AI-based CSI generation of the UE, based on the identification result.

14. The base station of claim 11, wherein the controller is further configured to:
   determine whether to deactivate at least one of different AI functions included in the UE, based on the change in the inference time; and
   transmit, to the UE, information instructing to deactivate at least one of the different functions included in the UE, based on the identification result.

15. The base station of claim 11, wherein the controller is further configured to transmit, to the UE, a trigger signal related to an aperiodic CSI report, wherein the trigger signal is one of a medium access control control element (MAC CE) or downlink control information (DCI).

16. A user equipment (UE) in a wireless communication system, the UE comprising:
   a transceiver; and
   a controller coupled with the transceiver,
   wherein the controller is configured to:
      transmit, to a base station, capability information indicating whether the UE is capable of generating artificial intelligence (AI)-based channel state information (CSI);
      identify state information of an AI chip that performs the AI-based CSI generation;
      identify a change in inference time related to the AI-based CSI generation based on the identified state information of the AI chip;
      transmit, to the base station, information on the identified change in the inference time related to the AI-based CSI generation and information on the change in the channel state;
      receive, from the base station, radio resource control (RRC) configuration information including a CSI report timing, based on the information on the change in the inference time and the change in the channel state;
      receive a CSI-reference signal (RS) from the base station; and
      transmit, to the base station, the CSI report based on the CSI-RS and the information on the CSI report timing.

17. The UE of claim 16, wherein the information on the CSI report timing, received from the base station, comprises:
   an offset for the CSI report including a value greater than the change in the inference change when the change in the inference time exceeds a first threshold and the change in the channel state is less than a second threshold; or
   a plurality of offsets for the CSI report when the change in the inference time exceeds the first threshold and the change in the channel state is greater than the second threshold.

18. The UE of claim 16, wherein the controller is further configured to receive, from the base station, information instructing to deactivate the AI-based CSI generation of the UE, based on the change in the inference time and the change in the channel state.

19. The UE of claim 16, wherein the controller is further configured to receive from the base station, information indicating to deactivate at least one of different AI functions included in the UE based on the change in the inference time.

20. The UE of claim 16, wherein the controller is further configured to receive, from the base station, a trigger signal related to an aperiodic CSI report, wherein the trigger signal is one of a medium access control control element (MAC CE) and downlink control information (DCI).

* * * * *